United States Patent [19]

Mahawili et al.

[11] 4,315,523

[45] Feb. 16, 1982

[54] ELECTRONICALLY CONTROLLED FLOW METER AND FLOW CONTROL SYSTEM

[75] Inventors: Imad Mahawili, Sunnyvale; Timothy J. Boyle, Cupertino, both of Calif.

[73] Assignee: American Flow Systems, Inc., Sunnyvale, Calif.

[21] Appl. No.: 127,918

[22] Filed: Mar. 6, 1980

[51] Int. Cl.³ .............................................. G01F 3/20
[52] U.S. Cl. ................................ 137/486; 137/487.5; 73/269
[58] Field of Search ............... 137/486, 487.5; 73/269, 73/270, 271

[56] References Cited

U.S. PATENT DOCUMENTS

| | | | |
|---|---|---|---|
| 287,587 | 10/1883 | Spooner | 73/270 |
| 3,181,360 | 5/1965 | Hederborst | 73/270 |
| 3,906,793 | 9/1975 | Wurzbacher | 73/269 |
| 4,067,239 | 1/1978 | Arvisenet | 73/270 |
| 4,134,423 | 1/1979 | Mayer | 137/486 |

*Primary Examiner*—Alan Cohan
*Attorney, Agent, or Firm*—Alan H. MacPherson; Steven F. Caserza

[57] ABSTRACT

A novel, low-friction, low-inertia flexible diaphragm containing a magnet formed as an integral part of the diaphragm is mounted in a chamber (preferably cylindrical). The chamber comprises part of the flow meter in a flow control system. One or more sensing devices are mounted on the walls of the chamber to sense the instantaneous position of the diaphragm. A novel electronic control circuit processes the data from the one or more sensing devices to provide measures of the flow rate during the displacement of the diaphragm along the cylinder. Signals are generated by the electronic control circuitry for switching a pair of three-way valves (one valve comprising the input valve and the other valve comprising the output valve) such that during one-half of a cycle the intput valve transfers fluid into the cylinder on one side of the diaphragm and, during the other half of the cycle, transfers fluid into the cylinder on the other side of the diaphragm. The output valve is switched synchronously with the input valve to transmit fluid from the other side or one side of the diaphragm to the output valve.

The electronic control system includes means for amplifying the output signals from the one or more sensing devices ("sensors") to provide one or more signals representing the position of the diaphragm as a function of time, means for converting the output signals from these amplifiers to digital form, and computation means for operating on the digitized output signals from the sensing devices to provide control signals for controlling a second input valve thereby to control the flow rate of the fluid being metered to within a desired range.

11 Claims, 16 Drawing Figures

MICRO COMPUTER BASED FLOW CONTROLLER INTERFACE STRUCTURE AND DATA PATHS

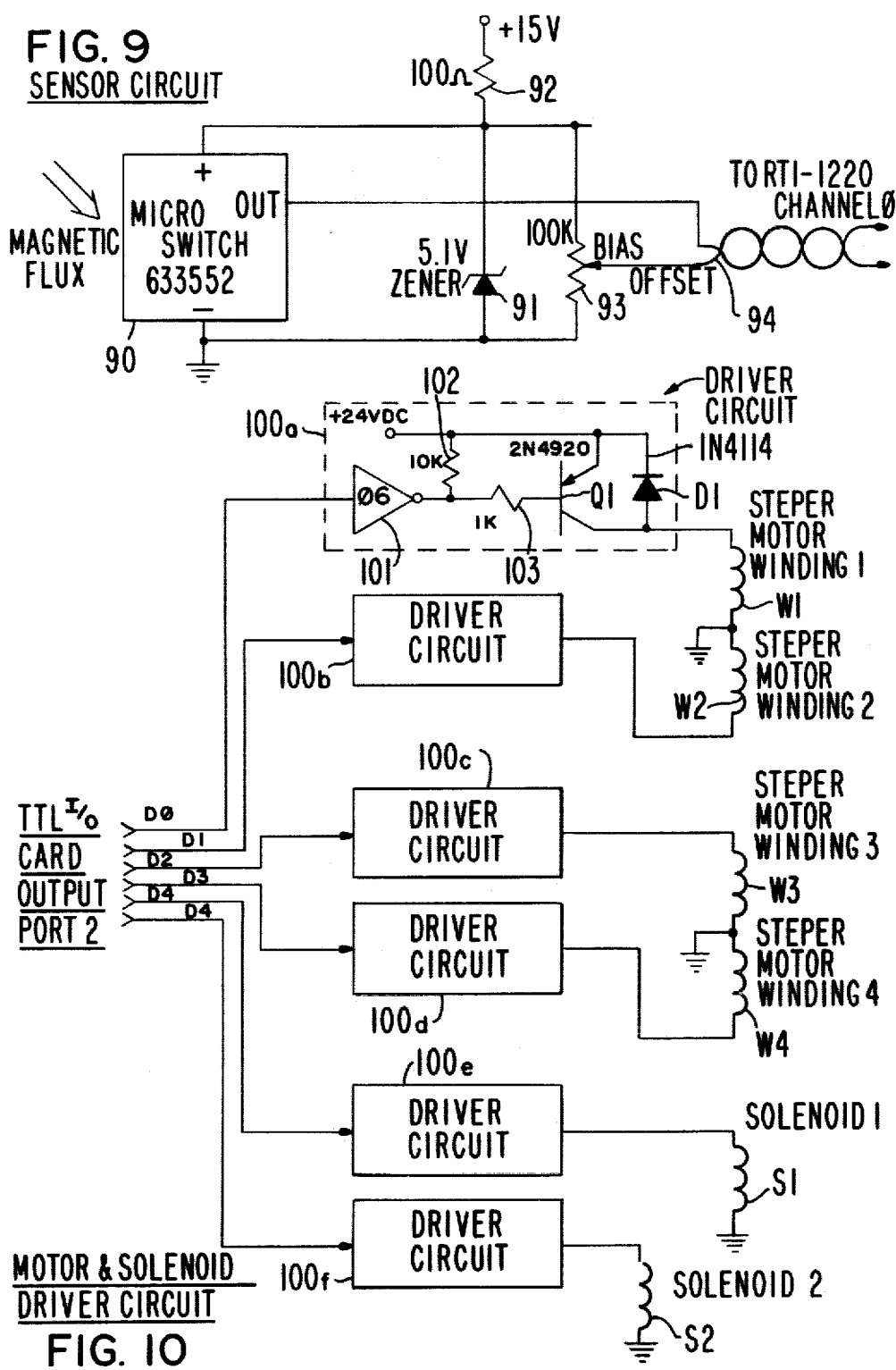

DISPLAY CIRCUIT

THUMBWHEEL INPUT CIRCUIT

ELECTRONICALLY CONTROLLED FLOW METER AND FLOW CONTROL SYSTEM

1. Field of the Invention

This invention relates to an electronic flow control system using an electronically-controlled positive displacement flow meter.

2. Prior Art

Positive displacement flow meters are well known. Thus British Pat. No. 1,051,710 published Dec. 21, 1966, discloses a positive displacement flow meter utilizing a cylinder wherein a reciprocating piston is controlled to move from one end to the other of the cylinder in response to the alternate passage of the fluid whose flow is being measured into the cylinder at one or the other end of the piston. As fluid under pressure enters one end of the cylinder via an inlet pipe, the piston is pushed along the cylinder and the fluid which entered the cylinder at the other end of the piston as a result of the previous stroke is forced into the outlet pipe. Valves in a well known arrangement allow fluid to alternately enter one end of the cylinder and be withdrawn from the other end of the cylinder and vice versa.

Other positive displacement flow meters are shown in U.S. Pat. No. 2,772,664 issued Dec. 4, 1956 to Jones, et. al., U.S. Pat. No. 3,181,360 issued May 4, 1965 to Hederhorst, and U.S. Pat. No. 3,657,925 issued Apr. 25, 1972 to Gross. The '710, '664, '925 and '360 patents all disclose reciprocating pistons as the positive displacement member. However, the '360 patent discloses in addition, the use of a flexible diaphragm 18 to seal a rigid piston 16 (FIG. 1 of the '360 patent), which travels between two chambers in a cylinder, to the cylinder wall. As one chamber is filled with gas or fluid, a like amount of gas or fluid is expelled from the other chamber. Reversal of the chambers in which gas is inserted and from which the gas is removed causes the diaphragm to reciprocate back and forth across the chamber. The number of strokes of the piston-diaphragm combination (with the diaphragm made of Teflon or rubber), is representative of the volume of gas passing through the meter.

U.S. Pat. No. 3,974,825 issued Aug. 17, 1976 discloses a pump using a flexible, pneumatically-driven diaphragm for pumping blood in an artificial heart.

Each of the above structures has certain disadvantages. A piston introduces inertia and friction into the flow system thereby affecting the flow to be measured. Moreover, the fluid whose flow is being measured often leaks past the piston. In addition, the frequency response of the system is limited by the inertia of the piston. For accurate flow control, a low inertia, low friction, accurate flow meter is required as an essential part of the control system.

SUMMARY OF THE INVENTION

This invention overcomes certain of the disadvantages of the prior art positive displacement flow meters. In accordance with this invention, a novel, low-friction, low-inertia flexible diaphragm containing a magnet formed as an integral part of the diaphragm is mounted in a chamber (preferably cylindrical). The chamber comprises part of the flow meter in a flow control system. One or more sensing devices are mounted on the walls of the chamber to sense the instantaneous position of the diaphragm. A novel electronic control circuit processes the data from the one or more sensing devices to provide measures of the flow rate during the displacement of the diaphragm along the cylinder. Signals are generated by the electronic control circuitry for switching a pair of three-way valves (one valve comprising the input valve and the other valve comprising the output valve) such that during one-half of a cycle the input valve transfers fluid into the cylinder on one side of the diaphragm and, during the other half of the cycle, transfers fluid into the cylinder on the other side of the diaphragm. The output valve is switched synchronously with the input valve to transmit fluid from the other side or one side of the diaphragm to the output valve.

The electronic control system includes means for amplifying the output signals from the one or more sensing devices ("sensors") to provide one or more signals representing the position of the diaphragm as a function of time, means for converting the output signals from these amplifiers to digital form, and computation means for operating on the digitized output signals from the sensing devices to provide control signals for controlling a second input valve thereby to control the flow rate of the fluid being metered to within a desired range.

As a feature of the invention, an output flow rate is not determined unless and until the diaphragm has traveled a selected distance or until a maximum time has elapsed, thereby to ensure that a minimum volume of fluid has entered the positive displacement flow meter portion of the control system and displaced the diaphragm at least a selected amount. By dividing this displacement by the time over which it occurs, the volumetric flow rate is obtained.

DESCRIPTION OF THE DRAWINGS

FIG. 9 shows a sensor circuit useful with this invention.

FIG. 10 shows the motor and solenoid driver circuits used with this invention.

DETAILED DESCRIPTION

While this invention will be described in conjunction with specific components in the electronic control circuitry, this description is exemplary only and is not intended to limit the scope of the invention.

Figure 1:
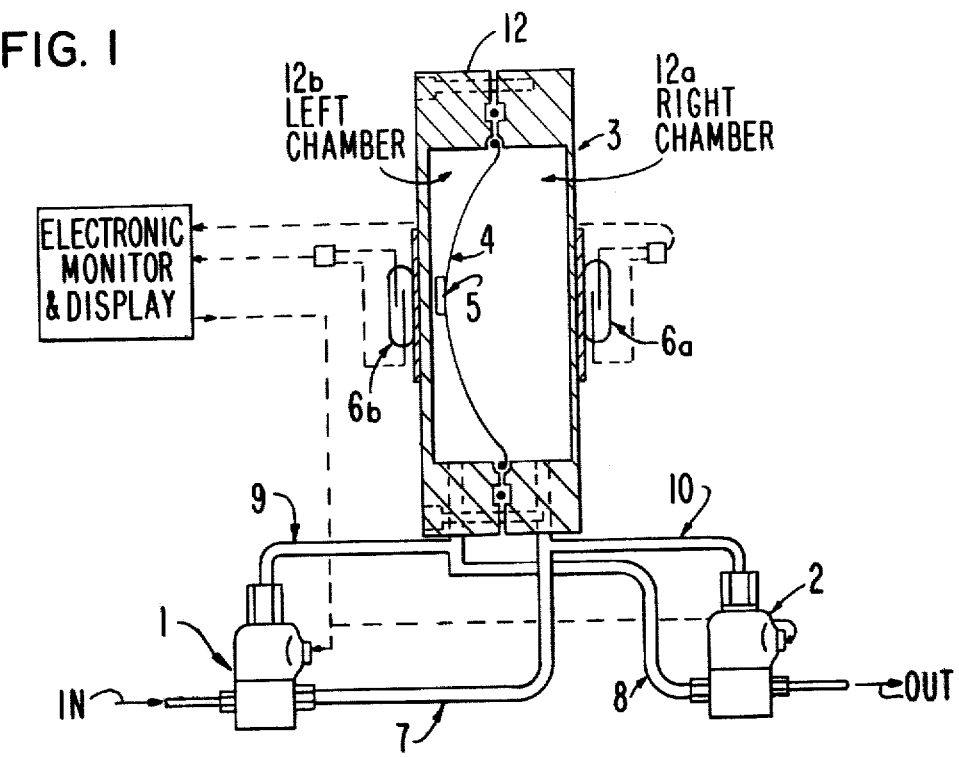
FIG. 1 illustrates schematically the chamber in which is located the positive displacement diaphragm used for measuring flow rate.

Turning now to FIG. 1, a flow chamber 12 containing a right chamber 12a and a left chamber 12b separated by diaphragm 4 is shown schematically. Diaphragm 4 has mounted on its center as an integral part thereof a magnet 5. Magnet 5 is completely coated with the material of which diaphragm 4 is constructed to protect magnet 5 from the fluid (possibly corrosive) being metered. On the left face of chamber 12 is a sensor 6b and on the right end of chamber 12 is a second sensor 6a. If desired, only one sensor (either 6a or 6b) can be used. While shown as reed switches, preferably, these sensors comprise Hall effect devices of the type known as LOHET (for "linear output, Hall-effect transducer") sensors such as described in more detail in *Electronic Design* 19, dated Sept. 27, 1979, on page 23. This article is incorporated herein by reference. Other Hall effect sensors can, of course, also be used with this invention.

The input flow is transmitted through three-way valve 1 (shown schematically) arranged to allow the flow to pass into line 9 connected directly to left chamber 12b. The entry of fluid into left chamber 12b displaces diaphragm 4 to the right thereby expelling fluid in the right chamber 12a through line 10. Three-way outlet valve 2 is, in this mode, adjusted to allow the fluid flowing from line 10 to pass directly into the output line.

Figure 6:
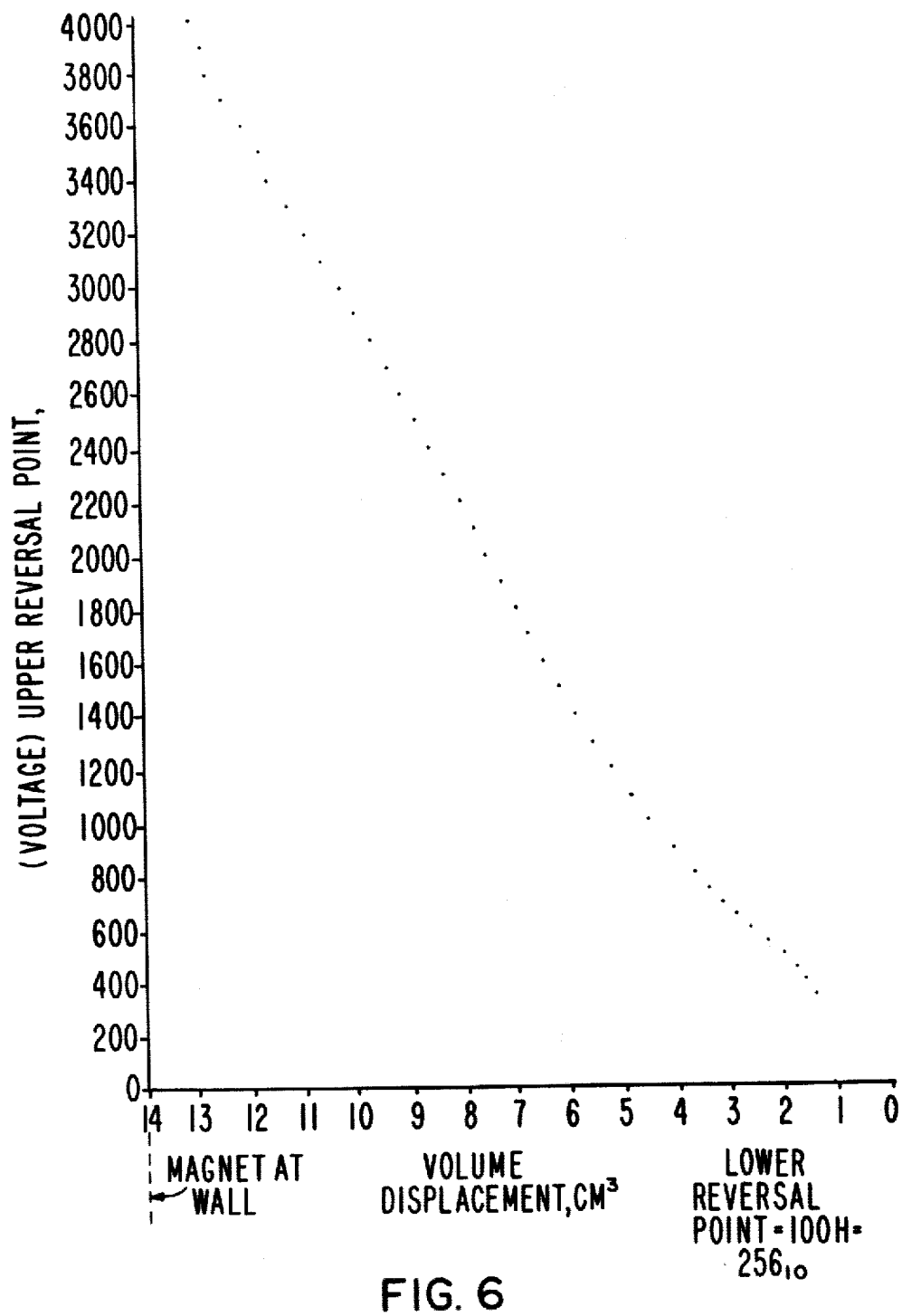
FIG. 6 shows a typical output voltage versus displacement curve used with this invention for calibrating the output voltage from a sensing element on the end of the cylinder to the position of the diaphragm within the cylinder.

During the entry of fluid into left chamber 12b, diaphragm 4 and magnet 5 move to the right toward Hall effect sensor 6a. The output signal from Hall effect sensor 6a is a function of the position of magnet 5, which in turn, is proportional as a function of time, to the rate of fluid flow through line 9 into left chamber 12b. As magnet 5 moves closer to sensor 6a due to the displacement of diaphragm 4 to the right, the Hall effect sensor 6a produces an output signal uniquely related to the position of magnet 5. This position as a function of time is a function of the flow rate. Sensor 6a produces an output signal which is monitored in a manner to be described later by the electronic control circuits. As magnet 5 reaches its rightmost position, a control signal is generated switching valves 1 and 2 such that the input gas now flows through line 7 into rightmost chamber 12a while the fluid in leftmost chamber 12b is expelled from this chamber through line 8 and outlet valve 2. Consequently, diaphragm 4 is forced to the left and magnet 5 now travels away from Hall effect sensor 6a and toward Hall effect sensor 6b. The output voltage from Hall effect sensor 6b is also uniquely related to the position of magnet 5. Since each sensor's output voltage is uniquely related to the position of the diaphragm, by measuring time independently, the sensor output voltage and thus the diaphragm position is determined as a function of time which allows the flow rate to be calculated given a calibration curve of volume versus diaphragm position (as shown in FIG. 6).

Figure 13:
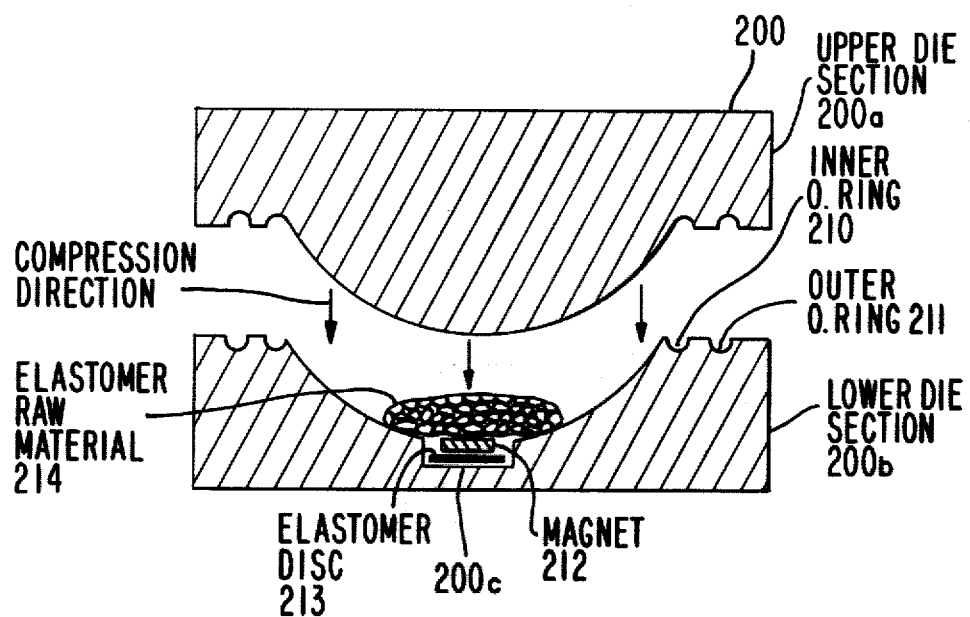
FIG. 13 shows schematically the method and structure for fabricating the diaphragm with an enclosed magnet used with this invention.

The use of a flexible diaphragm as part of a fluid meter is based on our discovery that, contrary to expectation, the diaphragm position as a function of volume of fluid in each chamber is predictable and repeatable each cycle despite the fact that the diaphragm is flexible and "loose" (i.e., the diaphragm is designed to interfere minimally with the fluid flow). Thus, diaphragm 4 serves to separate the left chamber 12b from the right chamber 12a while supporting magnet 5, the position of which is used to measure the fluid flow rate. The calibration of the position of magnet 5 to the output signals from sensors 6a and 6b is essential to the proper operation of this system. As is apparent from FIG. 1, diaphragm 4 can easily be replaced should it wear out by separating the two halves of cylinder 12, removing the old diaphragm and inserting a new diaphragm. Typically, to ensure a leakproof connection, diaphragm 4 has two "O-rings," an inner "O-ring" 210 and an outer "O-ring" 211 as shown in FIG. 13 (which shows the die used to fabricate the diaphragm).

It is apparent from the above description that the position of diaphragm 4 as a function of time is directly proportional to the volumetric flow rate of the fluid. By knowing the temperature and the pressure of the fluid the mass flow rate can be determined in a well known manner.

When sensors 6a and 6b comprise reed switches, the output signals from these switches occur with a frequency directly proportional to the flow rate and are used directly to actuate electronic circuitry for both valve actuation and feedback or other fluid control purposes. On the other hand, when the output sensors 6a and 6b are Hall effect devices, a continuous output signal is generated from each of these sensors. This output signal is related to the flow rate. By knowing the calibration curve of output signal level versus displacement of the diaphragm 4 and magnet 5, the volumetric flow rate can be calculated continuously as a function of the output signals from sensors 6a and 6b.

Diaphragm 4 is preferably made of an elastomeric material (viton is preferred but neoprene, silicon rubber and butyl rubber can also be used, as appropriate) which is suitable for use for temperatures up to 150° C. (180° C. for viton). For higher temperatures metal bellows can be used in place of the elastomeric diaphragm. The choice of the diaphragm 4 material depends on the particular fluid that is to be used, and the preferred operating temperatures. The differential pressure across the diaphragm is small in comparison to the working fluid pressures. Preferably this pressure difference is negligible. Viton is appropriate for temperatures between −40° C. and 180° C. and pressures between vacuum and 300 atmospheres.

The diaphragm with encapsulated magnet is made by a compression or transfer molding process. In this process (illustrated in FIG. 13), a metal die 200 containing upper section 200a and lower section 200b, is fabricated to the exact dimensions of the diaphragm. Die section 200b includes a central cavity 200c to house the magnet 212 (corresponding to magnet 4 in FIG. 1). A thin disc of the elastomer material 213 having the same or slightly larger diameter as the magnet disc 212 (approximately ½ inch and preferably formed of Alnico 8 or Cemarium cobalt) is first inserted into the magnet cavity 200c and the magnet 212 is placed on top of this thin disc. A pre-weighed amount of the elastomer raw material 214 is then put on top of the magnet 212, the material is heated to about 400° F. when Viton is the material and pressure is applied to it by the upper half 200a of the die 200 to mold and cure the elastomer 214 to the desired diaphragm shape. The pressure is merely that sufficient to achieve the desired result. The compression is conducted at an elevated temperature whose magnitude depends on the particular elastomer and results in elastomer material 214 and 213 assuming a substantially uniform thickness (typically 0.015" to 0.020" when Viton is the material) and consistency throughout the die 200. This operation ensures complete encapsulation of the magnet by the elastomer and excellent control of the diaphragm thickness. A Viton diaphragm typically has a durometer of fifty (50).

A particularly suitable valve for use as valves 1 and 2 (FIGS. 1 and 7) is the D30 three-way valve made by Precision Dynamics Company. This valve switches within about eight milliseconds and is fabricated out of 303 and 430 stainless steel with viton elastomer for the seals and O-rings. Other valves are also appropriate depending on design requirements.

The flow measurement by this device is reproducable well within one percent. Diaphragms or bellows can be easily replaced before fatigue sets in.

Figure 2A:
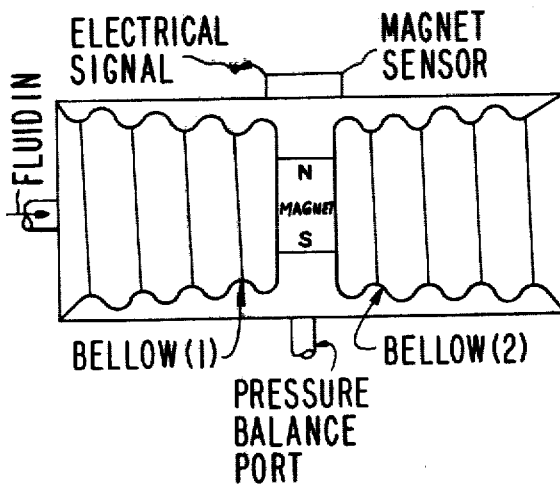
FIGS. 2a and 2b show diaphragms connected to the chamber by bellows and an O-ring type seal, respectively.
Figure 2B:
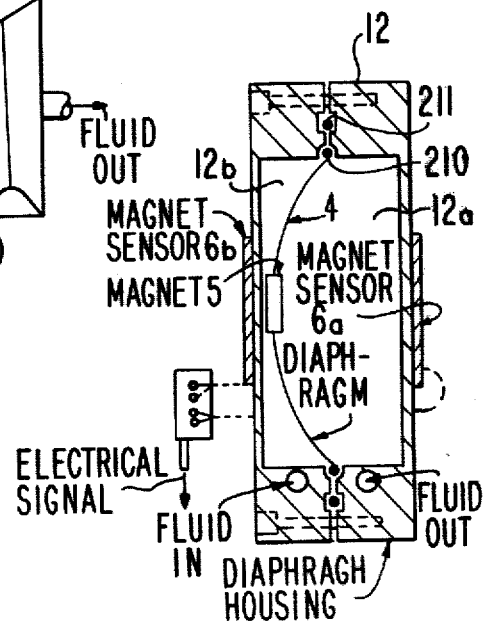

FIGS. 2a and 2b show two configurations for the diaphragm inside the cylinder. In FIG. 2a, a diaphragm has a magnet mounted internally to it which is protected by the material of the diaphragm. The diaphragm is then connected and sealed to the ends of two bellows. Each bellows is capable of contracting or expanding in response to lateral movement of the diaphragm in response to fluid entry into one or the other chambers of the cylinder. Thus when fluid enters the left chamber of the cylinder, the diaphragm and the magnet move to the right and the fluid in the right chamber is expelled. When fluid enters the right chamber, the magnet and the diaphragm move to the left expelling the fluid in the left chamber. A magnetic sensor mounted on the cylinder detects the motion of the magnet and thereby produces an output signal proportional to the position of the diaphragm. Typically the bellows comprises either a metal or polymer material and the diaphragm likewise comprises a polymer or metal material.

FIG. 2b shows a different construction wherein the diaphragm is attached between two portions of the cylinder. Again, a magnet 5 is mounted on the diaphragm 4 and coated with the diaphragm material thereby to protect it from the fluid whose flow is being measured. The entry of fluid to the left chamber 12b displaces diaphragm 4 and magnet 5 to the right as with the structure of FIG. 2a and similarly the entry of fluid to the right chamber displaces the diaphragm 4 and magnet 5 to the left, again as with the structure of FIG. 2a. The diaphragm is constructed such that its motion to the right or left occurs with very little friction or resistive force. Thus the flow of the fluid is not disturbed by the presence of the diaphragm. In addition, the weight of the diaphragm is kept very low thereby minimizing the inertia of the diaphragm. Magnetic sensors 6b and 6a are mounted on the left and right walls of the cylinder to detect the movement of the diaphragm-mounted magnet 5 to or from a given wall. In both FIGS. 2a and 2b a conventional set of two three-way flow valves (such as shown in FIG. 1) is used to first route the fluid into one chamber and out of the other chamber and then to reverse this pattern.

Contrary to the prior art meters using a free flowing piston, wherein the fluid whose flow is being measured can often leak from the left chamber to the right chamber and vice versa, this invention uses a flexible, low inertia diaphragm to seal one chamber from the other and thereby to prevent leakage while at the same time providing a relatively instantaneous measure of fluid flow rate.

Figure 3:
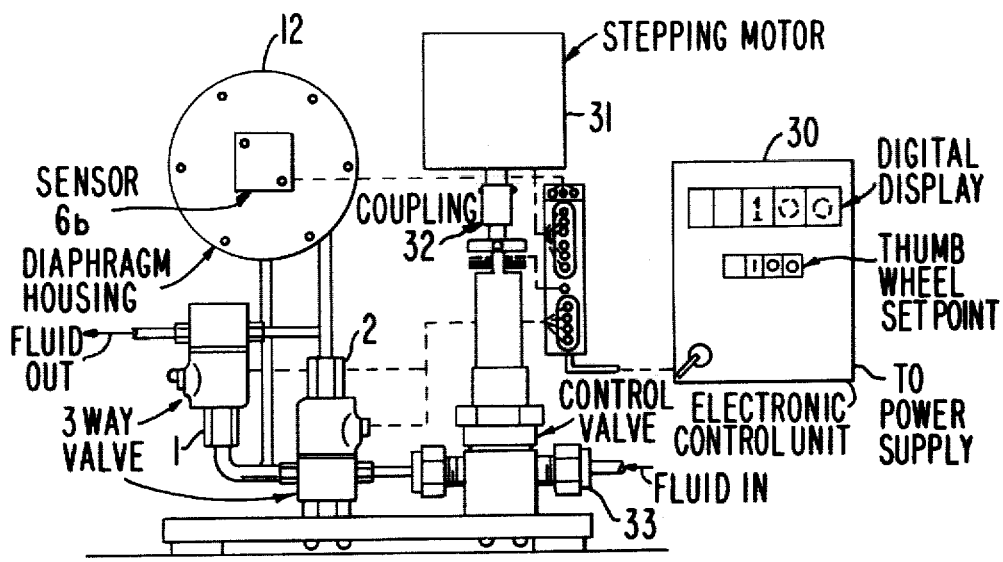
FIG. 3 shows schematically the connection of the sensing element on the end of the chamber containing the diaphragm through an electronic controller to an electronically controlled valve for maintaining the proper fluid flow.

FIG. 3 shows the structure of FIG. 1 (or the chambers of FIGS. 2a and 2b), in combination with an electronic controller 30, a DC stepping motor 31, and a clutch or coupling 32 joining the stepping motor to a valve 33 (typically a needle flow valve) for controlling the flow of fluid. The DC stepping motor 31 adjusts the position of the valve 33 until the flow rate detected by the meter corresponds to a flow rate setpoint input to the electronic controller 30. As will be shown later, the electronic controller 30 preferably comprises a microprocessor controlled digital circuit with an analog-to-digital converter, a sampling circuit, buffer stores, memory and selected input and display elements. The electronic controller 30 also controls the setting of the two three-way valves 1 and 2 to ensure that the fluid flow into the meter and from the meter is reversed at appropriate times to obtain maximum accuracy in the flow measurements. The system provides accurate and responsive feedback (or feed forward if desired) control. In the simplest form, the flow into one side of the cylinder 12 is reversed when the diaphragm reaches its extreme position one way or the other. The flow rate can, in this embodiment, be simply measured by the time it takes for the diaphragm to travel between the two extremes. That is, the flow rate is equal to the volume between the two extreme positions of the diaphragm 4 divided by the time taken by the diaphragm to travel between these two positions.

Figure 4:
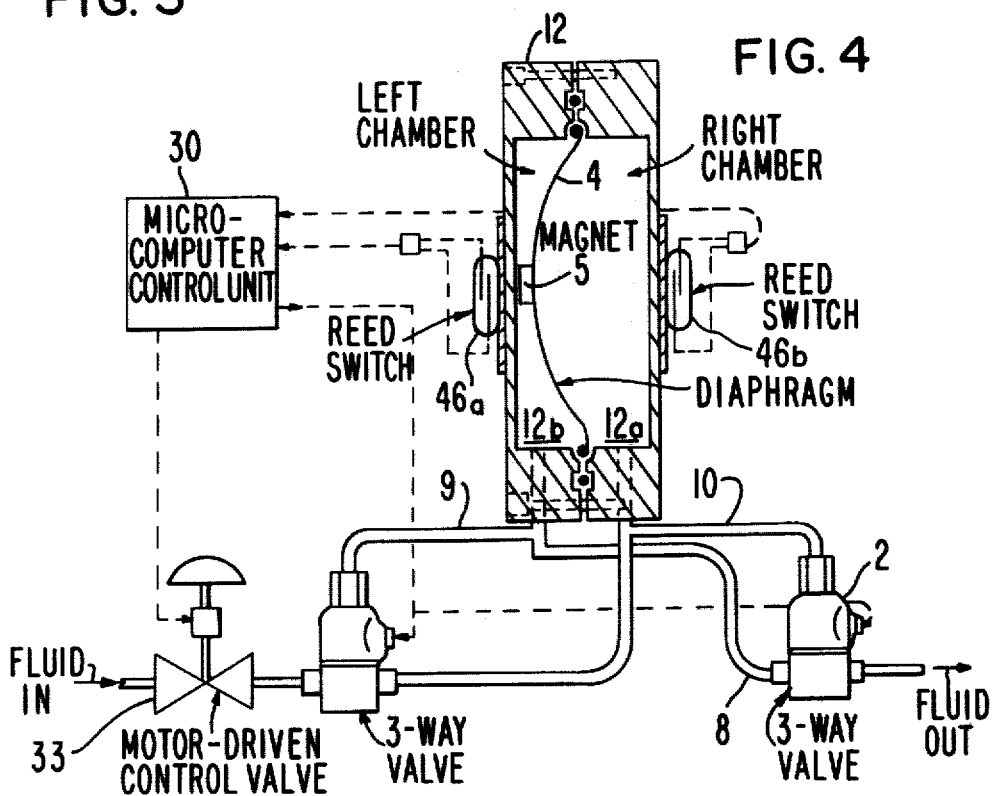
FIG. 4 shows schematically the relationship of the diaphragm, flow chamber, sensing elements, the microcomputer used to compute the control signals used to control the fluid flow rate, the fluid control valve and the structure for controlling the fluid flow into the flow chamber.
Figure 5A:
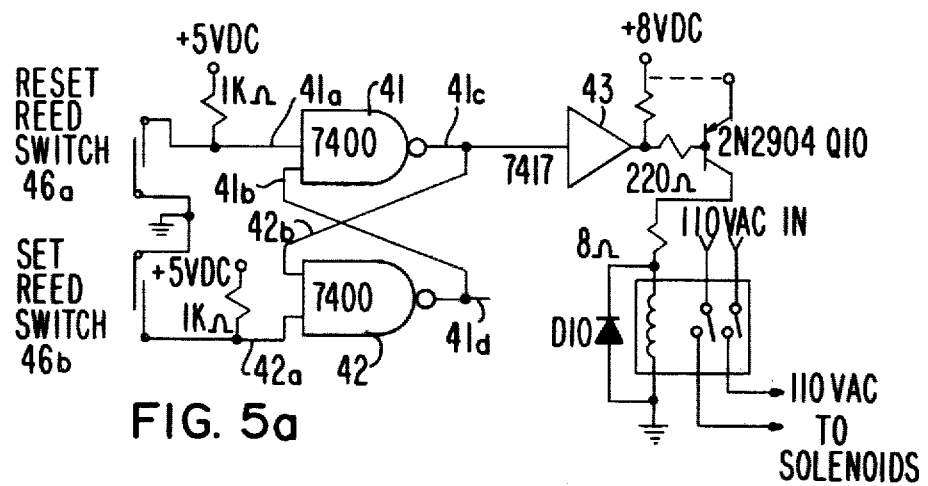
FIG. 5a shows the reed-switch flow reversal control circuit useful with this invention.

FIGS. 4 and 5a show an embodiment of this invention using a reed switch to detect the maximum displacement of the diaphragm adjacent each of the two walls of the cylinder 12. The reed switch signal is transmitted to a microcomputer control 30 which then calculates from the time taken for the two reed switches 46a and 46b to be sequentially actuated, the measured flow rate. This measured flow rate is compared to a reference flow rate set into memory and the difference is used to set a control valve 33 to bring about the proper flow rate. Solenoids and solid state relays are also actuated by the microcomputer control 30 to reverse the fluid flow into cylinder 12 at the maximum displacement points of the diaphragm 4.

FIG. 5a shows a circuit schematic of the structure used to respond to the change in state of the reed switches 46a and 46b due to the approach of magnet 5. A flip flop comprising two 7400 NAND gates 41 and 42 has as one input signal to each of the NAND gates the output signal representing the state of a given reed switch. Thus normally, when reed switch 46a is open, the signal level on input lead 41a to NAND gate 41 is at a high level corresponding to the 5 volt DC supply voltage. The other input lead 41b is coupled to the output lead 41d from the other NAND gate 42. The output signal on lead 41d is normally high level for at least one low level input signal. Thus, with the signal on output lead 41c low level, the signal on input lead 42b is low level and the signal on output lead 41d from gate 42 is high level, thereby holding the output signal from gate 41 at low level. When reed switch 46a is closed, the input signal on lead 41a to NAND gate 41 goes low thereby driving the output signal from NAND gate 41 to a high level. This high level output signal is transmitted to input lead 42b of NAND gate 42 and drives the output signal from NAND gate 42 to a low level thereby latching up the output of NAND gate 41 to a high level. The high level output signal from NAND gate 41 is amplified by amplifier 43 and turns off transistor Q10 (2N2904) thereby changing the current through a coil to close two relay control switches thereby activating solenoids to change the settings of the two three-way valves 1 and 2 shown in FIG. 1 and thus to reverse the flow. When diaphragm 4 arrives at the other side of the cylinder 12, reed switch 46b closes thereby driving the output signal from NAND gate 42 from low level (corresponding to two high level input signals) to high level thereby driving the output signal from NAND gate 41 to low level. This low level output signal is also amplified and used to turn on transistor Q10 thereby again activating a relay to reverse the two three-way flow valves 1 and 2 (FIG. 1) and thereby again to reverse the fluid flow.

FIG. 6 shows a typical curve of output signal from a Hall effect device (such as sensor 6b or 6a in FIG. 2b) versus position of the flow diaphragm 4. This curve is substantially linear over short portions but gradually flattens out as the diaphragm 4 moves away from the Hall sensor. The slope of voltage versus position (i.e., displacement) is negative such that the output voltage as a function of the distance of the diaphragm from the sensor increases with decreasing distance of the diaphragm from the sensor. Operation of the sensor in a region of substantially steep slope gives greater sensitivity and accuracy to the measurement of the fluid flow than does operation in a region of flatter slope. As will be discussed shortly, this feature is used to enhance the accuracy of certain flow measurements.

Figure 7:
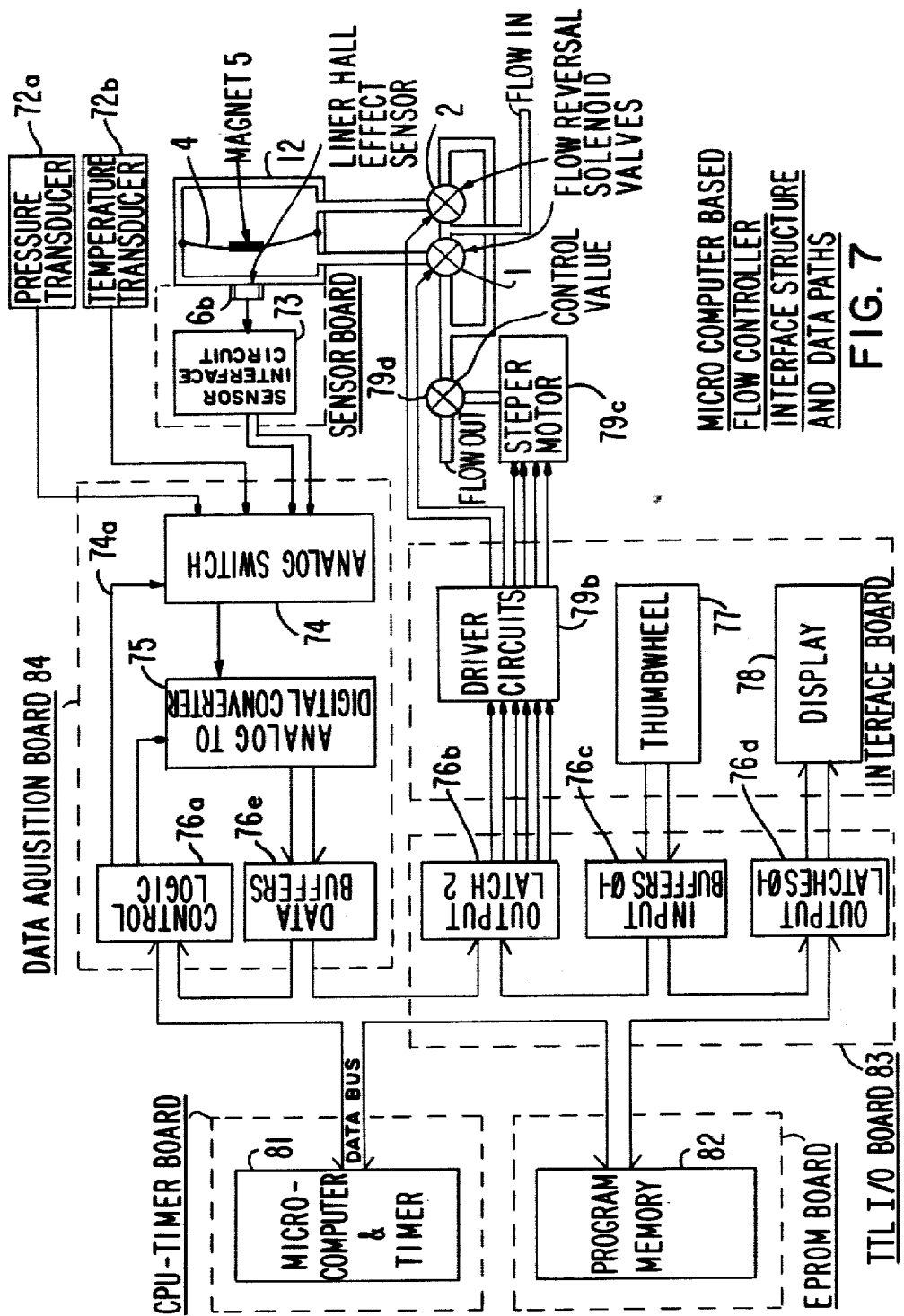
FIG. 7 shows the microcomputer based flow controller structure connected to the sensing element on the end of the chamber containing the diaphragm.

FIG. 7 discloses the preferred embodiment of this invention using a microcomputer-controlled digital circuit to provide proper feedback signals to control the flow rate. The microcomputer 81 operates on an output signal produced from the Hall effect sensor 6b mounted on the wall of the chamber 12 containing the flexible diaphragm 4 with magnet 5 formed as an integral part thereof.

FIG. 7 shows in block diagram form the electronic control circuitry used to process the information produced by the sensor 6b attached to chamber 12 containing the flexible diaphragm 4 used to measure flow rates in accordance with the invention. The output signal from Hall effect sensor 6b is transmitted through sensor interface circuit 73 to analog switch 74. Analog switch 74 comprises in one embodiment a well-known device for selecting a particular signal path in response to digital input signals (input to switch 74 on lines 74a from control logic 76a) for the purpose of passing a selected signal from either a pressure transducer 72a and a temperature transducer 72b (for the purpose for allowing the mass flow rate to be calculated from the volumetric information produced from the signal generated by sensor 6b attached to flow meter chamber 12) or from sensor interface circuit 73.

Figure 8:
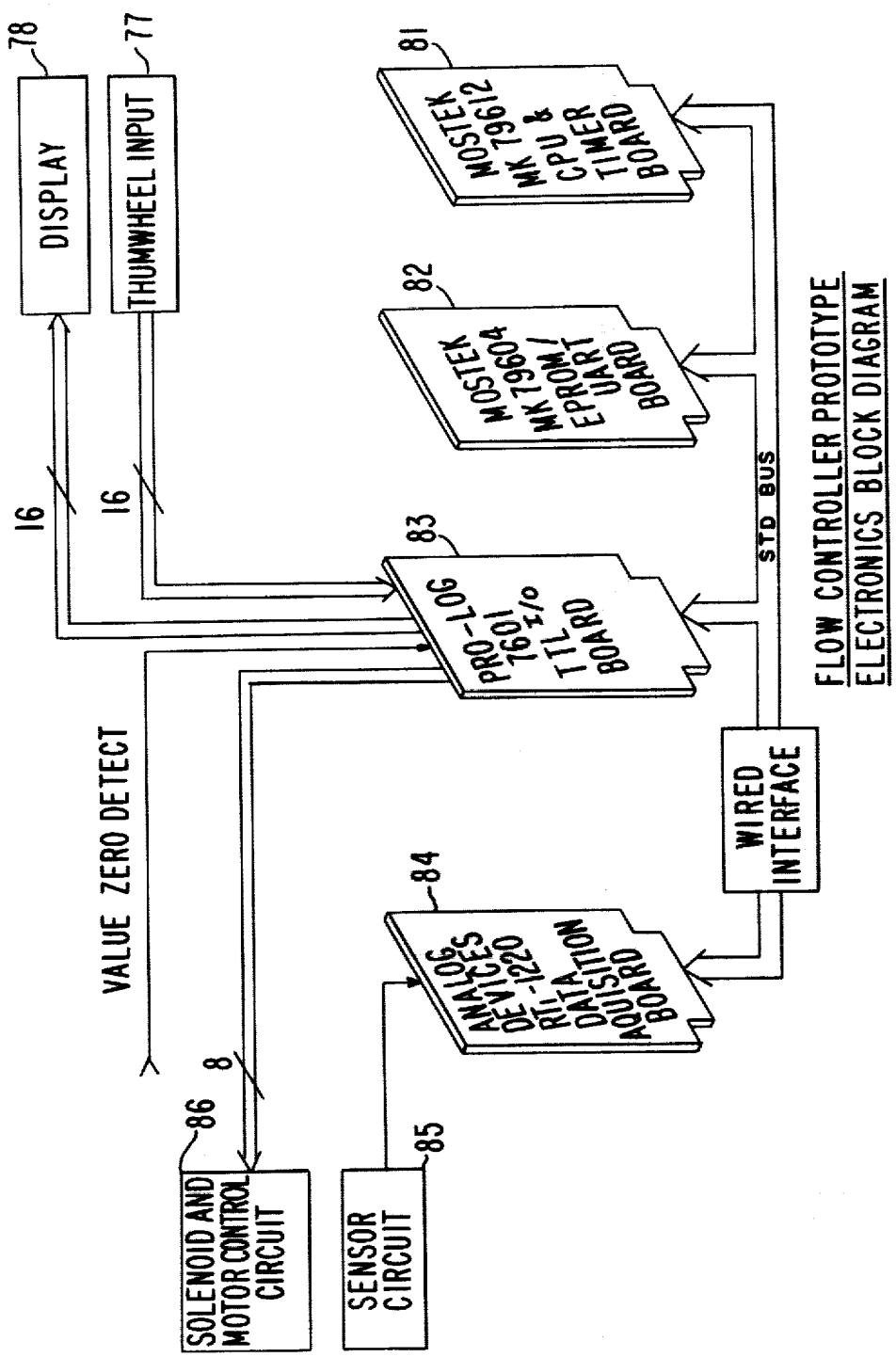
FIG. 8 shows the relationship of the various circuit boards used to process the signals from the sensor and to control the settings of the three-way flow valves 1 and 2 (FIGS. 1 and 7) which allow the fluid to pass into one or the other of the chambers in the cylinder, and which control the setting of the fluid control valve.

The output signal from analog switch 74 is transmitted to an analog-to-digital converter 75 of well known construction. Preferably, this converter comprises a twelve bit converter such as is used with the Analog Devices RTI-1220 Data Acquisition Board 84 (FIGS. 7 and 8). The output signal from A-to-D converter 75 comprises a digital signal representing any one of 4,096 possible signal levels. Of course, by selecting an A-to-D converter containing a different number of bits, a different level of accuracy can be obtained.

The output signal from A-to-D converter 75 is then transmitted to input buffer 76e. Input buffer 76e buffers the output signal from A-to-D converter 75 and holds this information until a request for this information is received from microcomputer 81. Microcomputer 81 comprises a Mostek MK79612 CPU and Timer Board which contains a CPU corresponding to the well known Z80 microprocessor. The MK79612 is shown in more detail in the Mostek publication entitled "MD Series Microcomputer Modules, Operations Manual for MDX-CPU 1" and subtitled "Z80 Central Processor Module MDX-CPU 1", copyright 1978 by Mostek Corporation. This document is also incorporated herein by reference. FIG. 8 shows the relationship of the Mostek MK79612 to the remainder of the circuit, the components of which are also shown in more detail in FIG. 7.

The control logic 76a, input buffer 76e, A-to-D converter 75 and analog switch 74 comprise the Analog Devices RTI 1220 data acquisition board 84 (shown as such in FIG. 8).

The output latches 76b, 76c and 76d comprise the Pro-Log 7601 TTL I/O board 83 also shown in FIG. 8. The program memory of the microcomputer 81 comprises the Mostek MK79604 Eprom/UART board 82 shown as such in FIG. 8.

The data bus interconnecting the CPU timer and the Eprom/UART portions of the structure to the Pro-Log 7601 TTL I/O board and the Analog Devices RTI 1220 data acquisition board comprises the STD bus, a standard bus used by Mostek and Pro-Log for interconnecting the components of a typical eight bit microcomputer system using an eight bit microprocessor (such as the Z80). The operation of the STD bus is described, for example, in the Pro-Log publication copyrighted 1979 entitled "Series 7000 STD Bus, Technical Manual." The operation of this bus is thus well know in the art and will not be described in detail. The above cited Pro-Log technical manual is incorporated herein by reference.

Control logic 76a generates several sets of output signals. First this logic generates a set of signals for controlling the setting of analog switch 74. These signals are transmitted on lead 74a. Logic 76a is driven by signals taken off the STD bus and generated by microcomputer 81.

Output latch 76b (part of TTL I/O Board 83) generates a signal to actuate driver circuit 79b which in turn produces signals which operate three-way valves 1 and 2. Driver circuit 79b is shown in more detail in FIG. 10 and will be described below.

Additional signals from output latch 76b also actuate driver circuits 79b which in turn drive stepper motor 79c. Stepper motor 79c controls the setting of control valve 79d which controls the flow rate though valves 1 and 2. Thus the output of latch 76b (derived from microcomputer 81) controls the setting of valve 79d in response to the flow rate measured from the signals produced by sensor 6b.

The reference signal used to determine the magnitude and direction of change in the position of valve 79d is derived by comparing the signal representing the flow rate computed from the signals from sensor 6b with another signal placed in input buffer 76c and derived from the setting of thumbwheel 77. The setting of thumbwheel 77 can be varied as desired by the operator thereby changing as desired the setting of control valve 79d. Basically, thumbwheel 77 converts a setting visible to the user to four binary-coded decimal digits (corresponding to 16 bits). These signals are held in input buffer 76c and are used by microcomputer 81 to calculate the proper control signal to be transmitted through output latch 76b to control the setting of valve 79d.

Output latch 76d is configured to retain the output signals from microcomputer 81 corresponding to the latest reading of the flow rate. The signals retained in latch 76d activate display 78 to display the latest value of flow rate calculated by microcomputer 81.

Structures corresponding to those shown in FIG. 7 are shown in FIG. 8. Those elements shown in block diagram form in FIG. 8 function as described above in connection with FIG. 7 and thus will not be described in more detail here.

Figure 11B:
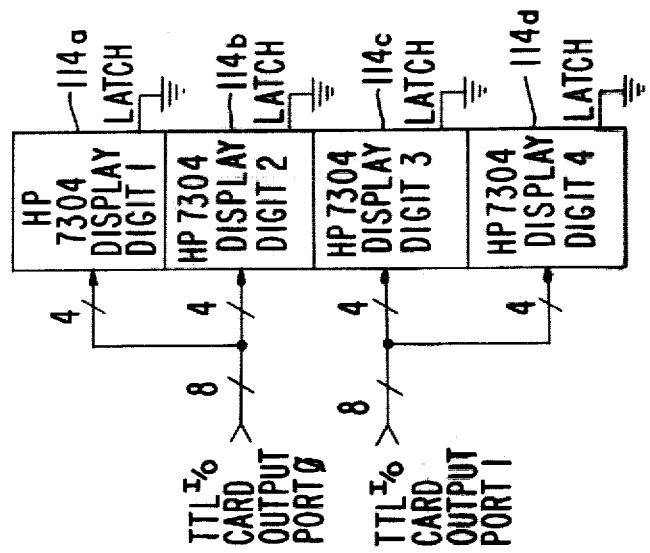
FIGS. 11a and 11b show schematically the thumbwheel digit input circuit and the display circuits used with this invention.
Figure 11A:
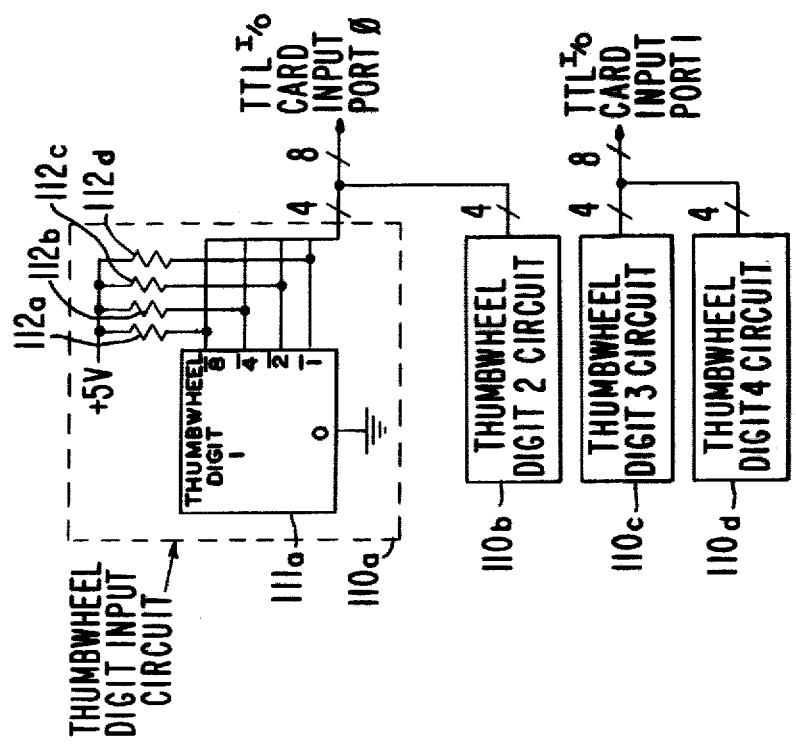

FIGS. 11a and 11b show in more detail the thumbwheel circuitry 110a through 110b and the display circuitry 114a through 114b used with this invention. The thumbwheel is capable of inputting four digits into the circuit. Each digit circuit 110b, 110c and 110d comprises a replica of the specific circuit 110a shown figuratively for digit one. This circuit is of a type well known in the arts and thus will not be described in detail except to say that if the thumbwheel is set, for example, on a 7, the switches within the thumbwheel corresponding to the 4, 2 and 1 level signals (connected to the 5 V supply voltage through resistors 112b, 112c and 112d, respectively), are closed thereby to provide an output signal for the TTL input at a level corresponding to the complement of 7 (negative logic). Any other decimal digit from 0 to 9 is selected by closing the corresponding switches to provide an output signal of the proper level.

The display likewise comprises a four digit display. Each display 114a, 114b, 114c and 114d comprises a well known decoder driver for taking a BCD input and converting it to a digital number ranging from 0 to 9. Typically, each display comprises an HP 7304 display of a type well known in the art.

FIG. 10 shows in more detail a typical drive circuit of the type used to drive the stepper motor 79c and the solenoid driven three-way valves 1 and 2 (the latter two valves being used as described above to reverse the flow in chamber 12). The driver circuits are driven by signals on input leads d0 through d5 derived from the TTL I/O card (FIGS. 7 and 8). The particular stepper motor windings to be energized depend upon the setting of the stepper motor (a record of which is recorded in the RAM memory of microcomputer 81) and the direction in which it is desired to move the stepper motor. The stepper motor will move a standard distance (typically (1/200)th of a revolution) once each step. A timer in the microcomputer allows the generation of a new step after a fixed time has elapsed. In the embodiment of this invention, this time is 7.5 milliseconds. The timer on the microcomputer board 81 interfaces with the microcomputer central processing unit (CPU) via interrupts. The timer generates periodically signals which are transmitted to the CPU on a separate line thereby to activate an interrupt circuit within the CPU through an interrupt pin. This signal then activates the CPU to calculate the next setting for the stepper motor; that is the CPU determines whether the stepper motor should be driven such that the control valve 79d is either opened or closed based upon the last flow rate reading present in the microcomputer when compared to the thumbwheel setting. Typically, the stepper motor is driven by a sequence of signals on input leads D0 through D3 corresponding to hexadecimal 5, 9, 6, A. Thus if the setting of the stepper motor corresponds to a 9, then the hexadecimal encoded binary 6 transmitted on input leads D0 through D3 will activate the stepper motor to move one setting in the proper direction to open. Should the stepper motor be instructed to close rather than open, then a hexadecimal encoded 5 would be transmitted in binary form on leads D0 through D3. In this latter case wherein the most significant digit corresponds to a zero, the second most significant digit corresponds to a one, the third most significant digit corresponds to a zero and the fourth most significant digit corresponds to a one (corresponding to the signals 0101 on leads D3 through D0, respectively), then the "1" on lead D0 will drive the output signal from inverter 101 to a low level thereby turning on transistor Q1 and energizing winding W1. Diode D1 prevents voltage pulses generated by changing the current through winding W1 from burning out transistor Q1 and resistors 102 and 103 comprise pull-up and base-drive resistors, respectively.

FIG. 9 shows the circuitry associated with the Hall-effect sensor 6b. The magnetic flux from the magnet 5 mounted within, and as an integral part of, diaphragm 4, is converted to a voltage and amplified to produce an output signal. Hall-effect sensor 6b preferably comprises part number 633SS2 made by Microswitch, Inc., a division of Honeywell. The output signal from microswitch 90 is transmitted via twisted-pair cable 94 to Analog Devices data acquisition board 84 (FIGS. 7 and 8). There this output signal activates the processor to operate in a way previously described. Pull-down resistor 92 (100 ohms) is connected between the fifteen volt power supply in series with a 5.1 volt zener diode 91 to ground. Variable resistor 93 (100K) is connected across the node between resistor 92 and diode 91 and ground. Resistor 93 is used to produce a bias offset for the other lead in the twisted pair 94 transmitting the output pulse from microswitch 90 to the data acquisition board 84. This bias offset comprises a way of compensating for the fact that the curve of flux versus voltage for the Hall-effect sensor does not pass through the origin. By adjusting the setting of variable resistor 93, the input signal to the control circuitry is offset (i.e., zero adjusted) to provide a signal within a desired range of magnitude.

Operation of the above described structure is implemented by a software program. The Microl high-level language version of this program is attached to this application as Appendix A. This program uses the Microl Language which is described in the User's Manual, Microl Language, dated Mar. 8, 1979. This Manual is incorporated herein by reference.

Figure 12:
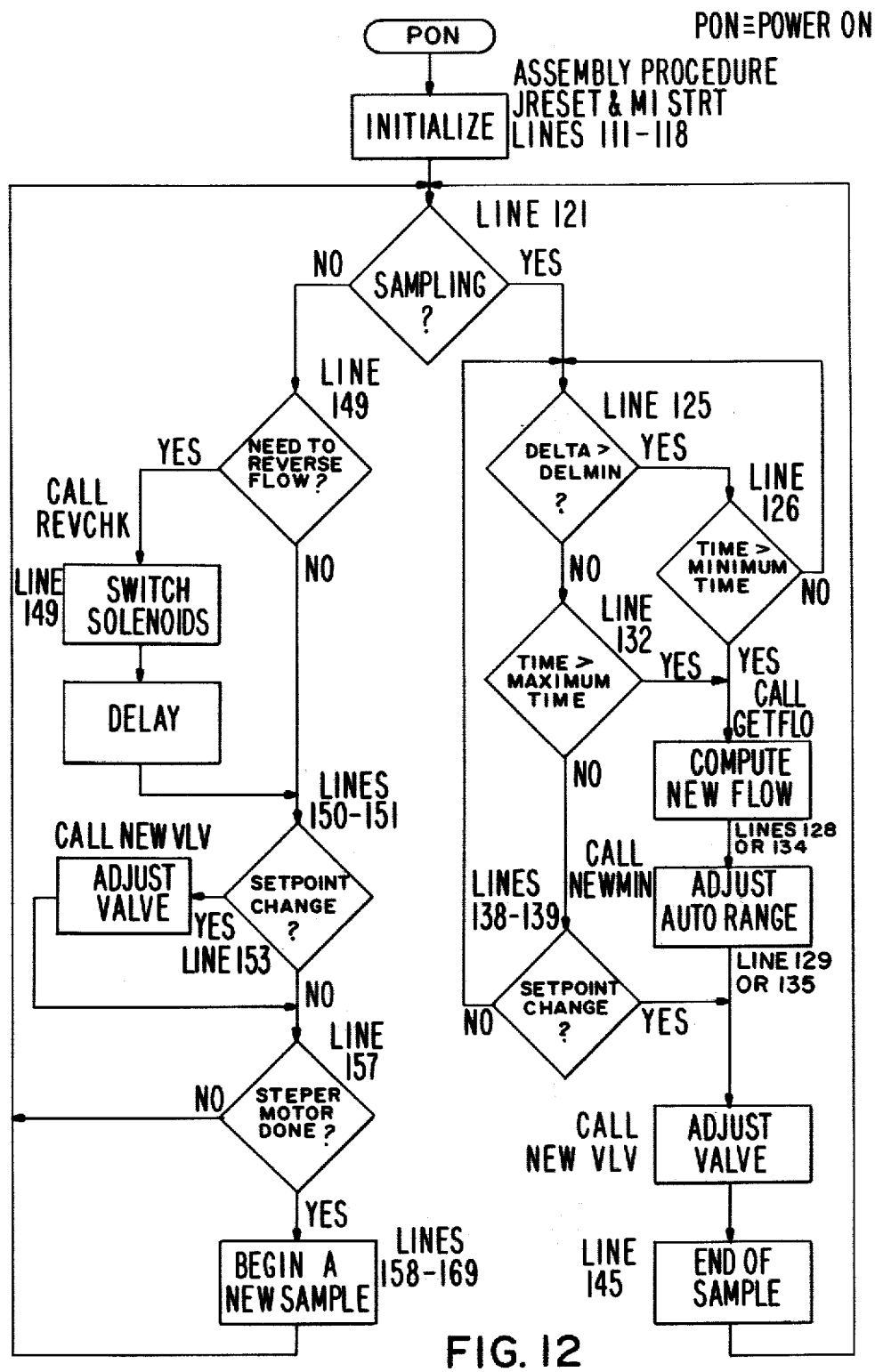
FIG. 12 shows the logic diagram for the computer program used in the microcomputer shown in FIG. 7 as part of the structure of this invention.

FIG. 12 illustrates the logic flow diagram of the computer program devised to operate microcomputer and timer 81 (FIGS. 7 and 8) in accordance with this invention. The computer program is designed to operate on the output signals from sensors 6b as processed by the data acquisition board 84 to determine flow rates. To do this one of several algorithms is employed. In the preferred mode of operation the flow rate is measured on a relatively continuous basis as a function of the displacement of diaphragm 4 across chamber 12 with time. This preferred mode does not depend upon the reversal of the direction of motion of diaphragm 4 to measure the flow rate but does set an optimum reversal point for changing the direction of motion of diaphragm 4 to ensure that at least a minimum voltage difference from sensor 6b as a function of the location of diaphragm 4 is obtained in a given time. In the limit, the minimum voltage difference per sample can be expanded to a value corresponding to the reversal point of the diaphragm. In this situation, the preferred mode reduces to the second, reversal dependent mode. In essence, the software emulates the operation of the reed switch mode, but in addition provides an autoranging capability (to be described later).

The second mode of operation contemplated for use with this invention is a reversal dependent mode. The program parameters are set to cover the highest and lowest expected flow rates (which correspond to the shortest and longest times for diaphragm 10 to complete one cycle). The setting of the reversal position for reversing the direction of motion of diaphragm 4 closer to its central neutral position results in a decrease in the cycle time. In this mode of operation, the reversal point is set to ensure at least one sample within some specified time for the lowest expected flow rate. In one embodiment, this specified time is on the order of two (2) seconds. This time must be much greater than eight milliseconds, the switching time of the valves.

In describing the operation of the program of this invention, certain conventions must be defined. Thus in the following description, a "conversion" comprises one look at the voltage produced by sensor 6b reflecting the position of diaphgram 4.

The average of four conversions comprises one "reading." The signal representing the average of these four conversions is a digital signal as is the signal representing each conversion.

Continuous readings are then made of the output signal from sensor 6b on a periodic basis until a change in voltage from 6b in excess of a minimum voltage change (DELMIN) is obtained. At this time, the systems has completed one "sample."

The system actually takes four conversions at the start of operation and continues taking groups of four conversions and averaging each group of four. Since it takes about 25 microseconds for each A-D conversion and there are four conversions per reading, 100 microseconds are required at a minimum for one reading. After each sample, the program tests to determine whether the direction of movement of the diaphragm should be reversed. Every seven and one-half milliseconds or thereabouts there is an interrupt and for a few microseconds the program then decides whether stepper motor 79c should be instructed to step valve 79d in one or another direction.

Every flow rate calculated from each sample is sent to a memory location called "FLOW." By comparing the calculated flow rate to the set point (placed in thumbwheel 77, FIG. 7) using the relationship "set point minus flow rate," a difference signal is obtained. Multiplying this difference signal by some non-negative control function gives a gain for use in determining the proper change in position of valve 79d. This gain is placed in "STPSIZ." The non-negative function is in turn a function of "set point minus flow rate" and can also be a function of one or more previous "set point minus flow rate" measurements. A separate interrupt program called "s-timer" looks every 7½ milliseconds at STPSIZ to decide whether to step up or to step down the valve.

In the above calculation, the program uses the subroutine "GETFLO" to calculate the flow. Subroutine "NEWVLV" corresponds to the control function which generates the new valve position. "STPSIZ" corresponds on a one-to-one basis to the steps on a valve. It then takes 7.5 milliseconds for the valve 79d to make one step. The program does not sample while the valve is opening or closing.

Once sampling is started, a sample is always obtained before the direction of motion of diaphragm 4 is reversed and before it is necessary to reverse the motion of diaphragm 4. An important part of the system is the calibration table calibrating the volumetric displacement of the diaphragm to the output signal from sensor 6b. To ensure an accurate conversion of the output signal from sensor 6b into a flow rate, the volumetric displacement of the diaphragm 4 represented by any given signal from sensor 6b must be determined accurately. Techniques for doing this are well known. One such technique comprises the discharge of a fluid from the output line into a vertical stand pipe in which the discharged fluid or gas displaces a colored liquid. By calibrating the stand pipe in terms of milliliters or cubic centimeters, for example, the volumetric displacement of diaphragm 4 can be measured with great accuracy. FIG. 6 shows a curve of voltage from sensor 6b versus volumetric displacement of diaphragm 4.

While the structure in FIG. 7 has been described as using one Hall effect device sensor, using two Hall effect devices, one on each side of chamber 12, yields twice the sensitivity to the measurement of flow rate. By using two Hall effect devices, the range of the devices is doubled. The diaphragm 4 can then travel a maximum excursion distance in chamber 12 and during its travel in the left portion of the chamber, sensor 6b is used while during its travel in the right portion of chamber 12 sensor 6a is used. In this manner, both sensors are operated in their range of maximum sensitivity and thus a sensor operating in its maximum range of sensitivity is used over the full travel of the diaphragm 4.

The thumbwheel 77 (FIGS. 7 and 8) is used to place into the system a "set point" which determines the flow rate to be allowed by valve 79d. The set point is placed into the thumbwheel. The system then measures the difference between a new set point and the old set point. The program then loops back through the set point change logic and produces an output signal proportional to the difference between the new set point and the old set point. If there is no change in the set point during this loop back the system then looks at a measured variable called "sampling."

The concept of "sampling" means taking a reading, calculating a diaphragm displacement from the reading, starting a timer within the system, measuring the output voltage from sensor 6b and testing to determine whether the minimum change in voltage is greater than a selected value. In the preferred embodiment, the minimum voltage change required to be detected from sensor 6b before a flow rate is calculated is 200 millivolts. Thus in reading voltage when sampling, a sufficient voltage change is allowed to ensure that the minimum voltage change has occurred or a maximum time has elapsed without having this minimum voltage change occur. If in this maximum time the system does not record a minimum voltage change (DELMIN) the system then assumes zero flow and opens the valve 79d (FIG. 7).

If the proper minimum voltage change (DELMIN) is obtained, the system then takes the measured voltage from sensor 6b and refers to the proper place on the voltage-displacement calibration curve (FIG. 6) to calculate the displacement change over time. From the displacement change over time and the time, the average flow rate over this time is calculated. Referring now to the calibration curve (FIG. 6) it is apparent that as the flow rate becomes lower, the displacement in a given time becomes less and the reversal point on the curve must move from right to left. That is, the diaphragm travels a smaller distance in a given time for a low flow rate than for a high flow rate and thus to maximize the sensitivity of voltage versus displacement, one must operate on the left-most portion of the curve rather than on the flatter right portion of the curve. The right most (farthest from sensor 6b) reversal point is selected to ensure that magnet 5 does not hit the wall and that there is time to generate a voltage change equal to DELMIN between the reversal point and the wall. The reversal point closest to sensor 6b is selected by a formula $C_1$-flow$\times C_2$ where $C_1$ and $C_2$ are selected constants equal to 3800 and 5, respectively, in the program of Appendices A and B.

The logic flow diagram shown in FIG. 12 describes the logic of the software program shown in Appendices A and B. The program is implemented in Microl, a block structured language for implementing programs on the Z80. This language is written in PASCAL and modeled after PASCAL. The Microl compiler produces the Z80 assembly language which is assembled and then linked with other modules to form the final object code. Microl is a publicly available high level language and is described in a document entitled "User's Manual Microl Language, Mar. 8, 1979." This document is herein incorporated by reference.

Referring to FIG. 12, at the start of the program, power on reset results in the program going to "JRESET" which initializes the processor (CPU) and timer, stepper motor and valve. Essentially the program closes the valve and turns off the timer. The program then jumps to the main control algorithm represented in the Microl procedure by MISTRT.

The main control algorithm calls these other Microl procedures to implement the computation of flow or displacement or new valve setting. MISTRT and these other Microl procedures call numerous short assembly language procedures to implement low level functions directly on the hardware (such as moving the stepper up or down one step or outputting to the display LEDs from a specified register). The program includes routines for handling two vectored interrupts (i.e., means in the hardware and program for jumping to different locations in memory when the two interrupts occur) generated by the timer. One interrupt is activated by the timer to keep track of elapsed time during a sample by incrementing a register or memory location every one-half microseconds. Another interrupt is activated by the stepper timer which generates an interrupt every $7\frac{1}{2}$ milliseconds and vectors to the interrupt servicing procedure (STIMER) to determine from memory location (STPSIZ) whether to move the stepper motor up or down or not at all. Once the program has been initialized, the program checks to determine whether or not the system is sampling. If the answer is "no," the program then checks to determine whether the flow into chamber 12 should be reversed. This test, which comprises measuring the output of sensor 6b to determine whether diaphragm 4 has reached its minimum or maximum point of excursion, yields either a "yes" or "no." If the answer is yes, the flow should be reversed. The program then initiates the subroutine which switches the solenoids which drive valves 1 and 2 (FIGS. 1 and 7) through driver circuit 79b and initiates a delay to ensure that the flow has actually reversed and the transients in the system have settled before starting to sample to measure flow rate during the reverse motion of the diaphragm. If the logic indicates there is no need to reverse flow, the system then determines whether or not there has been a set point change. If "yes," the valve 79d is adjusted by measuring the difference between the new set point and old set point. If the answer is "no," the system moves directly to the logical blocker stepper motor. If the valve was adjusted in response to a set point change, after the valve adjustment is completed the system also moves to the stepper motor logic. The stepper motor logic determines whether or not the stepper motor has moved to its desired position. If the answer is "no," then the system goes back to the initial sampling logic block. If the answer to "stepper motor done?" is "yes," the system begins a new sample and returns to sampling.

If the output of the system sampling block is "yes," the system determines whether the output of the sampling compared to a reference sample is greater than DELMIN. If the answer is "yes," the system determines whether or not the time is greater than the minimum time. If the answer is "yes," then the system computes a new flow rate and, depending upon the time, adjusts the auto range of the system. This last adjustment is an adjustment to the reversal point of diaphragm 4 by changing the level of the output signal from sensor 6b at which the direction of motion of diaphragm 4 is reversed. Once auto range has been completed, a new valve position is calculated from the flow rate measurement compared to the set point and valve 79d is appropriately adjusted. Finally an end of sample signal is produced which then causes the program to initiate sampling again.

If on the other hand the output signal from the DELMIN logic determines that the difference in the output signal from sensor 6b is less than the minimum required, a test is run to determine if the time between this sample and the previous sample is greater than the maximum time. If the answer is "yes," then a new flow rate is calculated and the auto range is adjusted as in the preceding sequence. If the answer is "no," then the system tests to determine if there has been a set point change. If the answer is "yes," the valve is adjusted as described above. If the answer is "no," the system loops back to run another test to determine if the new sampling voltage is greater than DELMIN.

The particular lines on the flow sample in the microcomplier version of the program shown in Appendix A which implement the particular logic block in FIG. 12 are shown on FIG. 12.

Appendix B gives the assembly language procedures called for by the Microl procedures in Appendix A.

As a feature of this invention, for applications not requiring the precision and versatility of computer controlled logic circuitry, several lower cost embodiments are possible using either the reed switches or the Hall effect devices. A multiple segment down counter can approximate the flow rate by counting down from a "maximum flow" between flow reversals. The rate of down counting is varied after a time interval lapses (the device will count slower after each elapsed interval). By this method, the function f=(c/t) is approximated by several straight line segments (where f equals the flow rate, c equals the count and t equals the time interval which has elapsed).

The method achieves moderate accuracy over a limited range with good repeatability and produces a direct digital output for very low cost when implemented using discrete logic.

A further improvement is to continuously vary the rate of down counting by using, for example, a capacitive discharge to drive a VCO whose oscillations are then used to drive the down count. It may be necessary to use a capacitive charge if the VCO has a negative voltage to frequency characteristic. In this case a baseline (i.e., zero bias) count would also be taken and subtracted to produce the direct digital representation of the flow.

The capacitive discharge itself can produce an approximation of the flow as a voltage. Accuracy and range is limited but can also be improved by multiple interval method described above with respect to the countdown technique.

The above embodiments disclose the use of sensing devices on the external walls of the chamber. Under some circumstances, the Hall-effect sensor can be molded into the diaphragm (with lead wires also in the diaphragm) and the magnets can be placed on the external walls of the cylinder. Compensation for temperature can be done in either the transducer or externally by a computer using a temperature input. Likewise, compensation for pressure changes can also be done in a similar manner.

Figure 5B:
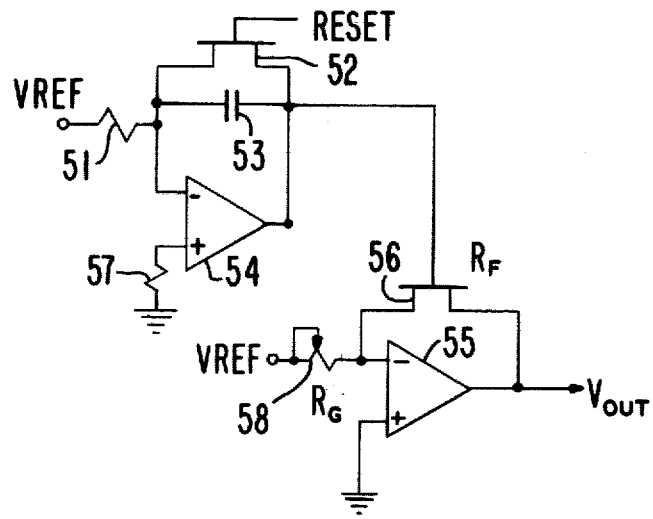
FIG. 5b shows a circuit useful with the circuit of FIG. 5a for producing an output voltage proportional to flow rate.

FIG. 5b illustrates a circuit which produces an output signal inversely proportional to time and therefore provides an output signal directly proportional to the flow rate. In this circuit, a reference voltage is applied to the negative input lead of operational amplifier 54 through input resistor 51. The positive input lead of operational amplifier 54 is connected through resistor 57 to ground. The reference signal is integrated by capacitor 53 in a well known manner when the gate voltage on reset FET transistor 52 is such that this transistor is turned off (i.e., non-conducting). The negative going output signal from operational amplifier 54 across capacitor 53 is then applied to the gate of depletion mode N-channel FET transistor 56. This transistor is a linear FET device with the source-drain resistance linearly proportional to the gate voltage. Thus as the gate voltage decreases linearly with time, the source-drain resistance of this transistor (a depletion mode device is normally conducting) increases with gate voltage. Thus, the output voltage from operational amplifier 55 (the negative input lead of which is connected to a reference voltage through input resistor $R_G$ and the positive input lead of which is connected to a suitable reference) drops hyperbolically with time (since its output voltage is proportional to $1/R_F$ where $R_F$ is the source to drain resistance of linear FET 56). Accordingly, at the time FET transistor 52 is turned on to discharge capacitor 53, the output voltage from operational amplifier 55 is proportional to the flow rate. Typically, FET transistor 52 is reset at each flow reversal of fluid into cylinder 12. Thus the output voltage from operational amplifier 55 at this time represents the flow rate and can be sampled and suitably operated on by the other components of this invention, in the manner described above.

APPENDIX A

```
                    MICROL COMPILER VERSION 1.5
1      0  0    (*SA-,M+,C+S*)
2      0  0        MODULE TJBM1 ;
3      0  0    (* Edit # : 44                                              *
4      0  0    *                                                           *
5      0  0    *                                                           *
6      0  0    *                                                           *
7      0  0    * Created By: TIM                                           *
8      0  0    * Date Last Edited: WED, FEB 20, 1980, 6:01 PM              *
9      0  0    * Last Edited By: TIM                                       *
10     0  0    * Date Last Compiled/Assembled: WED, FEB 20, 1980, 6:08 PM  *
11     0  0    * Last Compiled/Assembled By: TIM                           *
12     0  0    *                                                          *)
13     0  0
14     0  0    CONSTANT
15     0  0        TRUE=1;FALSE=0;
16     0  0        ADCMAX=3000;  (*HIGH REVERSAL POINT *)
17     0  0        MINMIN=1000;  (*MINIMUM LOW REVERSAL POINT*)
18     0  0        MINMAX=2300;  (*MAX. LOW REVERSAL POINT*)
19     0  0        MINCON=5;     (*AUTORANGING SCALE CONSTANT*)
20     0  0        MSTART=1.0;   (*STARTING VAL. OF d(VALVE)/d(FLOW) *)
21     0  0        MMAX=4.0;     (*MAX VALUE OF d(VALVE)/d(FLOW) *)
22     0  0        MMIN=0.1;     (* MIN. VALUE OF d(VALVE)/d(FLOW) *)
23     0  0        UP=1;DOWN=0;
24     0  0        SLOP=23;      (*FIXUP CONST. FOR PLAY IN VALVE COUPLING*)
25     0  0        SCALE=123.4;  (*CONVERSION CONST TO GET CC/MIN. FLOW *)
26     0  0        MAXTIM=6000;  (*MAXIMUM SAMPLE TIME IN .5 mS *)
27     0  0        MINTIM=300;   (*MINIMUM SAMPLE DURATION IN .5 mS*)
28     0  0        DELMIN=300;   (*MIN. READING DIFFERENCE FOR ALLOWABLE SAMPLE*)
29     0  0        VLVMAX=800;   (*MAXIMUM VALVE POSITION IN STEPS FROM CLOSED *)
30     0  0        SPLDLY=20;    (*CONST. FOR DELAY BEFORE STARTING SAMPLE*)
31     0  0        AVECON=2;     (*CONST. FOR 1/2 NO. OF CONVERSIONS PER READING*)
32     0  0
```

```
 33    0 0
 34    0 0    EXTERNAL
 35    0 0        RESET:ASSEMBLY PROCEDURE:BINT;
 36    0 0        SETIN:ASSEMBLY PROCEDURE:BINT;
 37    0 0        ADCIN:ASSEMBLY PROCEDURE:INTEGER;
 38    0 0        ADCSTS:ASSEMBLY PROCEDURE:BOOLEAN;
 39    0 0        ADCGO:ASSEMBLY PROCEDURE:BINT;
 40    0 0        LEDOUT:ASSEMBLY PROCEDURE:BINT;
 41    0 0        SINSTS:ASSEMBLY PROCEDURE:BOOLEAN;
 42    0 0        SOUTST:ASSEMBLY PROCEDURE:BOOLEAN;
 43    0 0        SIOIN:ASSEMBLY PROCEDURE:CHAR;
 44    0 0        SIOOUT:ASSEMBLY PROCEDURE:CHAR;
 45    0 0        VLVON:ASSEMBLY PROCEDURE:BINT;
 46    0 0        VLVOFF:ASSEMBLY PROCEDURE:BINT;
 47    0 0        SOLON:ASSEMBLY PROCEDURE:BINT;
 48    0 0        SOLOFF:ASSEMBLY PROCEDURE:BINT;
 49    0 0        STPOFF:ASSEMBLY PROCEDURE:BINT;
 50    0 0        STPUP:ASSEMBLY PROCEDURE:BINT;
 51    0 0        STPDN:ASSEMBLY PROCEDURE:BINT;
 52    0 0        TM0ON:ASSEMBLY PROCEDURE:BINT;
 53    0 0        TM0OFF:ASSEMBLY PROCEDURE:BINT;
 54    0 0        TM1ON:ASSEMBLY PROCEDURE:BINT;
 55    0 0        TM1OFF:ASSEMBLY PROCEDURE:BINT;
 56    0 0        STMON:ASSEMBLY PROCEDURE:BINT;
 57    0 0        STMOFF:ASSEMBLY PROCEDURE:BINT;
 58    0 0        INTON:ASSEMBLY PROCEDURE:BINT;
 59    0 0        INTOFF:ASSEMBLY PROCEDURE:BINT;
 60    0 0        VLVSTS:ASSEMBLY PROCEDURE:BOOLEAN;
 61    0 0        DCAL:ASSEMBLY PROCEDURE(INDEX:BINT):INTEGER;
 62    1 0
 63    1 0
 64    1 0        B1,B2,B3,B4:BINT;      (*SCRATCH PAD 8-BIT INTEGERS*)
 65    5 0        I1,I2,I3,I4:INTEGER;   (*SCRATCH PAD 16-BIT INTEGERS*)
 66   13 0        R1,R2:REAL;            (*SCRATCH PAD FLOATING POINT NOS.*)
 67   21 0        DUMMY:BINT;            (*BYTE BUCKET*)
 68   22 0        STPPOS:BINT;           (*BITS 0-3=STEPER WINDING ENERGIZ-
 69   23 0                                ATION PATERN (1=ON).BITS 4,5 ARE
 70   23 0                                SOLONOID 1,2(RESP.) ON/OFF.(1=ON) *)
 71   23 0
 72   23 0        TIME0:INTEGER;         (*ELAPSED TIME KEPT BY TIMER 0 *)
 73   25 0        TIME1:BINT;            (*ELASPED TIME KEPT BY TIMER 1*)
 74   26 0        STPSIZ:INTEGER;        (*THIS LOCATION CAN BE LOADED WITH THE
 75   28 0                                NO. OF STEPS (+/-) DESIRED TO MOVE THE STEPER;
 76   28 0                                IT IS UPDATED AFTER EACH STEP BY THE STEPER
 77   28 0                                TIMER INTERUPT ROUTINE.THUS AT ANY TIME IT
 78   28 0                                SHOWS THE NO. OF STEPS REMAINING TO BE
 79   28 0                                COMPLETED BEFORE THE STEPER IS AT THE DESIRED
 80   28 0                                LOCATION.*)
 81   28 0
 82   28 0        VLVPOS:INTEGER;        (*CURRENT VALVE POSITION*)
 83   30 0
 84   30 0
 85   30 0
 86   30 0    GLOBAL
 87    0 0        M1STRT:PROCEDURE:BINT;
 88    0 0
 89    0 0
 90    0 0    INTERNAL
 91    0 0        GETSET:PROCEDURE:INTEGER;
 92    0 0        DELTA:PROCEDURE:INTEGER;
 93    0 0        GETFLO:PROCEDURE:INTEGER;
 94    0 0        NEWVLV:PROCEDURE:INTEGER;
 95    0 0        FIXUP:PROCEDURE:BINT;
 96    0 0        REVCHK:PROCEDURE:BINT;
 97    0 0        FLOOUT:PROCEDURE:BINT;
 98    0 0        DISP:PROCEDURE:REAL;
 99    0 0        ADCAVE:PROCEDURE:INTEGER;
100    0 0        DELAY:PROCEDURE:BINT;
101    0 0        NEWMIN:PROCEDURE:INTEGER;
102    0 0
103    0 0        M:REAL;       (*CURRENT d(VALVE)/d(FLOW)*)
104    4 0        ADCOLD:INTEGER;  (*READING AT START OF SAMPLE *)
105    6 0        SETPT:INTEGER;   (*CURRENT SETPOINT*)
106    8 0        SAMPLE:BOOLEAN ; (*FLAG SET WHILE TAKING SAMPLE *)
107    9 0        DIR:BINT;  (*DIRECTION VALVE LAST MOVED *)
108   10 0        DSPOLD:REAL; (*DISPLACEMENT AT BEGINNING OF SAMPLE*)
```

```
109   14  0          FLOPOS:INTEGER;    (*VLVPOS FIXED TO ACCOUNT FOR SLOP*)
110   16  0          TIME:INTEGER;      (*TIME FROM BEGINNING OF SAMPLE*)
111   18  0          FLOW:INTEGER;      (*LATEST CALCULATED FLOW*)
112   20  0          DSPNEW:REAL;       (*DISPLACMENT OF LATEST READING*)
113   24  0          ADCNEW:INTEGER;    (*LATEST ADC READING*)
114   26  0          ADCMIN:INTEGER;    (*LATEST LOW REVERSAL POINT*)
115   28  0
116   28  0
117   28  0    (**********BEGINING OF MICROL CODE**********)
118   28  0
119    0  0  PROCEDURE M1STRT (*BINT*);
120    0  0  (* M1START IS THE MAIN CONTROL ALGORTHM. THE RESET
121    0  0     PROCEDURE JUMPS TO HERE AFTER POWER ON INITIALIZATION.*)
122    0  0  BEGIN
123    8  0    M:=MSTART;
124   22  0    SAMPLE:=FALSE;
125   27  0    SETPT:=0;
126   34  0    ADCMIN:=MINMIN;
127   41  0    DIR:=DOWN;
128   46  0    FLOPOS:=VLVPOS;
129   54  0    DUMMY:=STMON;
130   60  0    DUMMY:=TMOON;
131   66  0    REPEAT
132   66  0    BEGIN
133   66  0     IF SAMPLE THEN
134   74  0        BEGIN
135   74  0        REPEAT
136   74  0           BEGIN
137   74  0           IF DELTA>DELMIN THEN
138   89  0              IF TIME>MINTIM THEN
139  100  0                 BEGIN
140  100  0                 FLOW:=GETFLO;
141  106  0                 ADCMIN:=NEWMIN;
142  112  0                 EXIT;
143  115  0                 END;
144  115  0           IF TIME>MAXTIM THEN
145  128  0              BEGIN
146  128  0              FLOW:=GETFLO;
147  134  0              ADCMIN:=NEWMIN;
148  140  0              EXIT;
149  143  0              END;
150  143  0           I1:=SETPT;
151  151  0           IF I1<>GETSET THEN EXIT;
152  167  0           END;
153  169  0        STPSIZ:=NEWVLV;
154  175  0        DUMMY:=FIXUP;
155  181  0        DUMMY:=STMON;
156  187  0        DUMMY:=FLOOUT;
157  193  0        SAMPLE:=FALSE;
158  198  0        END
159  198  0     ELSE
160  201  0        BEGIN
161  201  0        DUMMY:=REVCHK;
162  207  0        I1:=SETPT;
163  215  0        IF I1<>GETSET THEN
164  228  0           BEGIN
165  228  0           STPSIZ:=NEWVLV;
166  234  0           DUMMY:=FIXUP;
167  240  0           DUMMY:=STMON;
168  246  0           END;
169  246  0        IF STPSIZ=0 THEN
170  255  0           BEGIN
171  255  0           DUMMY:=STMOFF;
172  261  0           I1:=SPLDLY;
173  268  0           DUMMY:=DELAY;
174  274  0           I1:=ADCAVE;
175  280  0           TIME0:=0;
176  287  0           I2:=ADCAVE;
177  293  0           ADCNEW:=(I1+I2) DIV 2;
178  309  0           ADCOLD:=ADCNEW;
179  314  0           DSPOLD:=DISP;
180  324  0           DUMMY:=STPOFF;
181  330  0           SAMPLE:=TRUE;
182  335  0           END;
183  335  0        END;
184  335  0  END;
```

```
185     338   0 END;
186     339   0
187     339   0
188     339   0 PROCEDURE GETSET;
189     339   0 (* GETSET INPUTS A SET POINT READING FROM THE THUMBWHEEL*)
190     339   0 BEGIN
191     340   0 REPEAT
192     340   0    BEGIN
193     340   0    DUMMY:=SETIN;
194     345   0    SETPT:=INTEGER(100*INTEGER(B3));
195     362   0    SETPT:=SETPT+10*INTEGER(B2);
196     383   0    SETPT:=SETPT+INTEGER(B1);
197     394   0    IF SETPT>=0 THEN
198     403   0    IF SETPT<1000 THEN EXIT;
199     418   0    B1:=0EH;
200     423   0    B2:=0EH;
201     428   0    DUMMY:=LEDOUT;
202     434   0    END;
203     436   0 RETURN(SETPT);
204     442   0 END;
205     443   0
206     443   0
207     443   0 PROCEDURE DELTA;
208     443   0 (* DELTA COMPUTES THE DIFFERENCE IN THE CURRENT ADC
209     443   0    READING FROM THE READING WHICH STARTED THE SAMLPLE*)
210     443   0 BEGIN
211     448   0 I1:=ADCAVE;
212     454   0 TIME:=TIME0;
213     462   0 I2:=ADCAVE;
214     468   0 ADCNEW:=(I1+I2) DIV 2;
215     484   0 I3:=ADCNEW-ADCOLD;
216     494   0 IF I3<0 THEN I3:=(-I3);
217     518   0 RETURN(I3);
218     524   0 END;
219     525   0
220     525   0 PROCEDURE GETFLO;
221     525   0 (*GETFLO COMPUTES THE FLOW FROM THE CHANGE IN DISPLACMENT
222     525   0    DURING A SAMPLE DIVIDED BY THE LENGTH OF THE SAMPLE*)
223     525   0 BEGIN
224     531   0 DSPNEW:=DISP;
225     541   0 R2:=DSPNEW-DSPOLD;
226     563   0 IF R2<0 THEN R2:=(-R2);
227     585   0 IF TIME=0 THEN TIME:=1;
228     602   0 R1:=(SCALE*R2)/REAL(TIME);
229     640   0 FLOW:=INTEGER(R1);
230     647   0 IF FLOW<0 THEN FLOW:=0;
231     661   0 IF FLOW>9999 THEN FLOW:=9999;
232     681   0 RETURN(FLOW);
233     687   0 END;
234     688   0
235     688   0 PROCEDURE DISP;
236     688   0 (* DISP USES THE CALIBRATION TABLE (ACCESSED THROUGH
237     688   0    DCAL) TO FIND THE VOLUME DISPLACEMENT CORRESPONDING
238     688   0    TO THE CURRENT ADC READING. IT USES LINEAR INTERPOLATION
239     688   0    BETWEEN CALIBRATION POINTS TO MAKE THE CALCULATION*)
240     688   0 BEGIN
241     693   0 B1:=BINT(ADCNEW DIV 100);
242     705   0 B2:=B1+1;
243     709   0 I3:=DCAL(B1);
244     721   0 I1:=DCAL(B2)-I3;
245     740   0 R1:=(REAL(ADCNEW MOD 100))/100.0;
246     773   0 RETURN(REAL(I3)+(R1*REAL(I1)));
247     809   0 END;
248     810   0
249     810   0
250     810   0 PROCEDURE NEWVLV;
251     810   0 (*NEWVLV CALCULATES THE REQUIRED CHANGE IN THE VALVE
252     810   0    POSITION BASED ON THE CURRENT VALVE POSITION,THE
253     810   0    SET POINT, AND THE FLOW. THE RESULT IS THE NUMBER
254     810   0    OF STEPS + OR - TO MOVE THE STEPER.*)
255     810   0 BEGIN
256     816   0 IF FLOPOS>0 THEN
257     829   0 IF FLOW>0 THEN
258     842   0    BEGIN
259     842   0    M:=REAL(FLOW)/REAL(FLOPOS);
260     867   0    IF M>MMAX THEN
```

```
261    879   0        M:=MMAX;
262    893   0      IF M<MMIN THEN
263    915   0        M:=MMIN;
264    929   0      END;
265    929   0  I2:=GETSET-FLOW;
266    942   0  R1:=REAL(I2);
267    953   0  I2:=INTEGER(R1*M);
268    975   0  IF I2<-200 THEN I2:=-200;
269    989   0  IF I2>200 THEN I2:=200;
270   1009   0  FLOPOS:=FLOPOS+I2;
271   1020   0  IF FLOPOS<0 THEN FLOPOS:=0;
272   1033   0  IF FLOPOS>VLVMAX THEN FLOPOS:=VLVMAX;
273   1053   0  RETURN(I2);
274   1059   0  END;
275   1060   0
276   1060   0  PROCEDURE FIXUP;
277   1060   0  (*FIXUP ALTERS THE NUMBER OF STEPS SENT TO THE STEPER
278   1060   0     TO ACCOUNT FOR THE SLOP IN THE COUPLING WHEN CHANGING
279   1060   0     DIRECTIONS.*)
280   1060   0  BEGIN
281   1065   0  IF STPSIZ>0 THEN
282   1078   0  IF DIR=DOWN THEN
283   1085   0      BEGIN
284   1085   0      STPSIZ:=STPSIZ+SLOP;
285   1093   0      DIR:=UP;
286   1098   0      END;
287   1098   0  IF STPSIZ<0 THEN
288   1110   0  IF DIR=UP THEN
289   1118   0      BEGIN
290   1118   0      STPSIZ:=STPSIZ-SLOP;
291   1130   0      DIR:=DOWN;
292   1135   0      END;
293   1135   0  END;
294   1136   0
295   1136   0
296   1136   0  PROCEDURE REVCHK;
297   1136   0  (* REVCHK CHECKS TO SEE IF THE FLOW SHOULD BE REVERSED
298   1136   0     BASED ON THE CURRENT VALUE OF ADCMIN AND ADCMAX.
299   1136   0     IF SO IT PERFORMS THE REVERSAL AND ALLOWS A SHORT
300   1136   0     DELAY FOR STABILITY*)
301   1136   0  BEGIN
302   1142   0  DUMMY:=INTOFF;
303   1148   0  I4:=(ADCAVE+ADCAVE) DIV 2;
304   1155   0  DUMMY:=INTON;
305   1171   0  IF I4>ADCMAX THEN
306   1184   0      DUMMY:=SOLON;
307   1190   0      REPEAT
308   1190   0          IF ADCAVE<(ADCMAX-50) THEN EXIT;
309   1207   0  IF I4<ADCMIN THEN
310   1220   0      DUMMY:=SOLOFF;
311   1226   0      REPEAT
312   1226   0          IF ADCAVE>(ADCMIN+50) THEN EXIT;
313   1249   0  END;
314   1250   0
315   1250   0
316   1250   0  PROCEDURE FLOOUT;
317   1250   0  (*FLOOUT TAKES THE CURRENT VALUE OF THE FLOW AND OUTPUTS
318   1250   0     IT TO THE LED DISPLAY*)
319   1250   0  BEGIN
320   1256   0  B1:=0EH;
321   1261   0  B2:=0EH;
322   1266   0  B3:=0EH;
323   1271   0  I1:=FLOW;
324   1279   0  IF I1>=0 THEN
325   1289   0  IF I1<10000 THEN
326   1301   0      BEGIN
327   1301   0      B1:=BINT(I1 MOD 10);
328   1314   0      I1:=I1 DIV 10;
329   1325   0      B2:=BINT(I1 MOD 10);
330   1335   0      I1:=I1 DIV 10;
331   1346   0      B3:=BINT(I1 MOD 10);
332   1356   0      I1:=I1 DIV 10;
333   1367   0      B4:=BINT(I1 MOD 10);
334   1377   0      END;
335   1377   0  DUMMY:=LEDOUT;
336   1383   0  END;
```

```
337   1384  0
338   1384  0
339   1384  0 PROCEDURE ADCAVE;
340   1384  0 (*ADCAVE TAKES "AVECON" ADC CONVERSIONS AND AVERAGES THEM TO
341   1384  0    REDUCE ERROR AND NOISE*)
342   1384  0 BEGIN
343   1392  0    B1:=AVECON;
344   1397  0    I4:=0;
345   1404  0    REPEAT
346   1404  0       BEGIN
347   1404  0       DUMMY:=ADCGO;
348   1410  0       REPEAT
349   1410  0          IF ADCSTS THEN EXIT;
350   1423  0          I4:=I4+ADCIN;
351   1434  0          IF DECZ(H1) THEN EXIT;
352   1444  0       END;
353   1446  0    I4:=I4 DIV AVECON;
354   1457  0    RETURN(I4);
355   1460  0 END;
356   1461  0
357   1461  0
358   1461  0 PROCEDURE DELAY;
359   1461  0 (*DELAY IS A DELAY LOOP WHICH DELAYS T1/2 MILLISECONDS*)
360   1461  0 BEGIN
361   1463  0 TIME0:=0;
362   1470  0 REPEAT
363   1470  0    IF TIME0>T1 THEN EXIT;
364   1488  0 END;
365   1489  0
366   1489  0
367   1489  0 PROCEDURE NEWMIN;
368   1489  0 (*NEWMIN CALCULATES A NEW REVERSAL POINT BASED ON THE
369   1489  0    CURRENT FLOW*)
370   1489  0 BEGIN
371   1496  0 ADCMIN:=MINMAX-(MINCON*FLOW);
372   1516  0 IF ADCMIN>MINMAX THEN ADCMIN:=MINMAX;
373   1536  0 IF ADCMIN<MINMIN THEN ADCMIN:=MINMIN;
374   1552  0 END;
375   1553  0
376   1553  0
377   1553  0 END.
378   1553  0
379   1553  0
ERROR COUNT  0
```

APPENDIX B

```
'80 RELOCATABLE ASSEMBLER -- VERSION 2.3   THU, FEB  7, 1980,  5:42 PM

INE  ERR ADDR R OBJECT
----  --- ---- - ------

1                      (*$A+,M+,C+S*)
  2                           MODULE TJBA1 ;
  3                      (* Edit # : 9
  4                       *
  5                       *
  6                       *
  7                       * Created By: TIM
  8                       * Date Last Edited: THU, FEB  7, 1980,  5:39 PM
  9                       * Last Edited By: TIM
 10                       * Date Last Compiled/Assembled: THU, FEB  7, 1980,  5:41
 11                       * Last Compiled/Assembled By: TIM
 12                       *
 13                       *LIST
 14        ;(*$A+,M+,C+S*)
 15        0000          M?TJBA1            EQU $
 16        ;    MODULE TJBA1 ;
 17        ;(* Edit # : 9                                                   *
 18        ; *                                                              *
 19        ; *                                                              *
 20        ; *                                                              *
 21        ; * Created By: TIM                                              *
 22        ; * Date Last Edited: THU, FEB  7, 1980,  5:39 PM                *
 23        ; * Last Edited By: TIM                                          *
```

```
 24        ; * Date Last Compiled/Assembled: THU, FEB  7, 1980,  5:41 PM    *
 25        ; * Last Compiled/Assembled By: TIM                              *
 26        ; *                                                             *)
 27        ;
 28        ;EXTERNAL
 30                         M?M1STRT            EXT L?M1STRT
 31        ;   M1STRT:PROCEDURE:BINT;
 32        ;
 33        ;
 34        ;
 35        0000                                 DATA
 36        ;GLOBAL
 38                         M?RESET             GBL L?RESET
 39        ;   RESET:ASSEMBLY PROCEDURE:BINT;
 41                         M?SETIN             GBL L?SETIN
 42        ;   SETIN: ASSEMBLY PROCEDURE: BINT;
 44                         M?ADCIN             GBL L?ADCIN
 45        ;   ADCIN:ASSEMBLY PROCEDURE:INTEGER;
 47                         M?ADCSTS            GBL L?ADCSTS
 48        ;   ADCSTS:ASSEMBLY PROCEDURE:BOOLEAN;
 50                         M?ADCGO             GBL L?ADCGO
 51        ;   ADCGO:ASSEMBLY PROCEDURE:BINT;
 53                         M?LEDOUT            GBL L?LEDOUT
 54        ;   LEDOUT:ASSEMBLY PROCEDURE:BINT;
 56                         M?SINSTS            GBL L?SINSTS
 57        ;   SINSTS:ASSEMBLY PROCEDURE:BOOLEAN;
 59                         M?SOUTST            GBL L?SOUTST
 60        ;   SOUTST:ASSEMBLY PROCEDURE:BOOLEAN;
 62                         M?SIOIN             GBL L?SIOIN
 63        ;   SIOIN:ASSEMBLY PROCEDURE:CHAR;
 65                         M?SIOOUT            GBL L?SIOOUT
 66        ;   SIOOUT:ASSEMBLY PROCEDURE:CHAR;
 68                         M?VLVON             GBL L?VLVON
 69        ;   VLVON:ASSEMBLY PROCEDURE:BINT;
 71                         M?VLVOFF            GBL L?VLVOFF
 72        ;   VLVOFF:ASSEMBLY PROCEDURE:BINT;
 74                         M?SOLON             GBL L?SOLON
 75        ;   SOLON:ASSEMBLY PROCEDURE:BINT;
 77                         M?SOLOFF            GBL L?SOLOFF
 78        ;   SOLOFF:ASSEMBLY PROCEDURE:BINT;
 80                         M?STPOFF            GBL L?STPOFF
 81        ;   STPOFF:ASSEMBLY PROCEDURE:BINT;
 83                         M?STPUP             GBL L?STPUP
 84        ;   STPUP:ASSEMBLY PROCEDURE:BINT;
 86                         M?STPDN             GBL L?STPDN
 87        ;   STPDN:ASSEMBLY PROCEDURE:BINT;
 89                         M?TM0ON             GBL L?TM0ON
 90        ;   TM0ON:ASSEMBLY PROCEDURE:BINT;
 92                         M?TM0OFF            GBL L?TM0OFF
 93        ;   TM0OFF:ASSEMBLY PROCEDURE:BINT;
 95                         M?TM1ON             GBL L?TM1ON
 96        ;   TM1ON:ASSEMBLY PROCEDURE:BINT;
 98                         M?TM1OFF            GBL L?TM1OFF
 99        ;   TM1OFF:ASSEMBLY PROCEDURE:BINT;
101                         M?STMON             GBL L?STMON
102        ;   STMON:ASSEMBLY PROCEDURE:BINT;
104                         M?STMOFF            GBL L?STMOFF
105        ;   STMOFF:ASSEMBLY PROCEDURE:BINT;
107                         M?INTOFF            GBL L?INTOFF
109        ;   INTOFF:ASSEMBLY PROCEDURE:BINT;
110                         M?INTON             GBL L?INTON
111        ;   INTON:ASSEMBLY PROCEDURE:BINT;
113                         M?VLVSTS            GBL L?VLVSTS
114        ;   VLVSTS:ASSEMBLY PROCEDURE:BOOLEAN;
115        ;
116        ;
117                         M?B1                GBL BINT
118        0000             M?B1                DEFS   1
119                         M?B2                GBL BINT
120        0001             M?B2                DEFS   1
121                         M?B3                GBL BINT
122        0002             M?B3                DEFS   1
123                         M?B4                GBL BINT
124        0003             M?B4                DEFS   1
125        ;   B1,B2,B3,B4:BINT;
```

```
126                          M?I1              GBL INTEGER
127         0004             M?I1              DEFS    2
128                          M?I2              GBL INTEGER
129         0006             M?I2              DEFS    2
130                          M?I3              GBL INTEGER
131         0008             M?I3              DEFS    2
132                          M?I4              GBL INTEGER
133         000A             M?I4              DEFS    2
134         ;   I1,I2,I3,I4:INTEGER;
135                          M?R1              GBL REAL
136         000C             M?R1              DEFS    4
137                          M?R2              GBL REAL
138         0010             M?R2              DEFS    4
139         ;   R1,R2:REAL;
140                          M?C1              GBL CHAR
141         0014             M?C1              DEFS    1
142         ;   C1:CHAR;
143                          M?DUMMY           GBL BINT
144         0015             M?DUMMY           DEFS    1
145         ;   DUMMY:BINT;
146                          M?STPPOS          GBL BINT
147         0015             M?STPPOS          DEFS    1
148         ;   STPPOS:BINT;
149                          M?TIME0           GBL INTEGER
150         0017             M?TIME0           DEFS    2
151         ;   TIME0:INTEGER;
152                          M?TIME1           GBL BINT
153         0019             M?TIME1           DEFS    1
154         ;   TIME1:BINT;
155                          M?STPSIZ          GBL INTEGER
156         001A             M?STPSIZ          DEFS    2
157         ;   STPSIZ:INTEGER;
158                          M?VLVPOS          GBL INTEGER
159         001C             M?VLVPOS          DEFS    2
160         ;   VLVPOS:INTEGER;
161         ;
162         ;
163         001E                               DATA
164         ;INTERNAL
165         ;   LOROM:ASSEMBLY PROCEDURE:BINT;
166         ;   PRCSET:ASSEMBLY PROCEDURE:BINT;
167         ;   MEMSET:ASSEMBLY PROCEDURE:BINT;
168         ;   PORTSET:ASSEMBLY PROCEDURE:BINT;
169         ;   ADCSET:ASSEMBLY PROCEDURE:BINT;
170         ;   SIOSET:ASSEMBLY PROCEDURE:BINT;
171         ;   CTCSET:ASSEMBLY PROCEDURE:BINT;
172         ;   STPSET:ASSEMBLY PROCEDURE:BINT;
173         ;   TIMER0:ASSEMBLY PROCEDURE:BINT;
174         ;   TIMER1:ASSEMBLY PROCEDURE:BINT;
175         ;   STIMER:ASSEMBLY PROCEDURE:BINT;
176         ;   JRESET:ASSEMBLY PROCEDURE:BINT;
177         ;   JSETIN: ASSEMBLY PROCEDURE: BINT;
178         ;   JADCIN:ASSEMBLY PROCEDURE:INTEGER;
179         ;   JADCSTS:ASSEMBLY PROCEDURE:BOOLEAN;
180         ;   JADCGO:ASSEMBLY PROCEDURE:BINT;
181         ;   JLEDOUT:ASSEMBLY PROCEDURE:BINT;
182         ;   JSINSTS:ASSEMBLY PROCEDURE:BOOLEAN;
183         ;   JSOUTST:ASSEMBLY PROCEDURE:BOOLEAN;
184         ;   JSIOIN:ASSEMBLY PROCEDURE:CHAR;
185         ;   JSIOOUT:ASSEMBLY PROCEDURE:CHAR;
186         ;   JVLVON:ASSEMBLY PROCEDURE:BINT;
187         ;   JVLVOFF:ASSEMBLY PROCEDURE:BINT;
188         ;   JSOLON:ASSEMBLY PROCEDURE:BINT;
189         ;   JSOLOFF:ASSEMBLY PROCEDURE:BINT;
190         ;   JSTPOFF:ASSEMBLY PROCEDURE:BINT;
191         ;   JSTPUP:ASSEMBLY PROCEDURE:BINT;
192         ;   JSTPDN:ASSEMBLY PROCEDURE:BINT;
193         ;   JTM0ON:ASSEMBLY PROCEDURE:BINT;
194         ;   JTM0OFF:ASSEMBLY PROCEDURE:BINT;
195         ;   JTM1ON:ASSEMBLY PROCEDURE:BINT;
196         ;   JTM1OFF:ASSEMBLY PROCEDURE:BINT;
197         ;   JSTMON:ASSEMBLY PROCEDURE:BINT;
198         ;   JSTMOFF:ASSEMBLY PROCEDURE:BINT;
199         ;   JINTOFF:ASSEMBLY PROCEDURE:BINT;
200         ;   JINTON:ASSEMBLY PROCEDURE:BINT;
```

```
201      ;    JVLVSTS:ASSEMBLY PROCEDURE:BOOLEAN;
202      ;
203      ;
204                       *NOLIST
207                       *LIST
208   0000    SETLO:     EQU    0
209   0001    SETHI:     EQU    1
210   0000    LEDLO:     EQU    0
211   0001    LEDHI:     EQU    1
212   0002    STPOUT:    EQU    2
213   0002    STATIN:    EQU    2
214   F0FC    ADCLO:     EQU    0F0FCH
215   F0FD    ADCHI:     EQU    0F0FDH
216   F0FB    ADCEOC:    EQU    0F0FBH
217   F0FF    ADCSEL:    EQU    0F0FFH
218   F0F9    ADCMUX:    EQU    0F0F9H
219   F0FA    ADCCON:    EQU    0F0FAH
220   00DD    SIOCON:    EQU    0DDH
221   00DE    SIOSC:     EQU    0DEH
222   00DD    SIOSTS:    EQU    0DDH
223   00DC    SIODAT:    EQU    0DCH
224   0040    DAVMSK:    EQU    40H
225   0080    RDYMSK:    EQU    80H
226   007C    CTC0:      EQU    7CH
227   007D    CTC1:      EQU    7DH
228   007E    CTC2:      EQU    7EH
229   007F    CTC3:      EQU    7FH
230   0008    CTCVEC:    EQU    08H
231   0085    CTCEN:     EQU    85H
232   00A5    CTCSEN:    EQU    0A5H
233   0003    CTCRES:    EQU    03H
234   0001    CTCDIS:    EQU    01H
235   004C    CTCTC:     EQU    76
236   004B    CTCSTC:    EQU    75
237   0320    VLVMAX:    EQU    800
238   0000                       CODE
239   0000    M?MEMSET           EQU $
240   FF00    DSTART:    EQU    0FF00H
241   FFFF    DTOP:      EQU    0FFFFH
242   0000    B1:        EQU    M?B1
243   0001    B2:        EQU    M?B2
244   0002    B3:        EQU    M?B3
245   0003    B4:        EQU    M?B4
246   0004    I1:        EQU    M?I1
247   0006    I2:        EQU    M?I2
248   0008    I3:        EQU    M?I3
249   000A    I4:        EQU    M?I4
250   000C    R1:        EQU    M?R1
251   0010    R2:        EQU    M?R2
252   0014    C1:        EQU    M?C1
253   0015    DUMMY:     EQU    M?DUMMY
254   0016    STPPOS:    EQU    M?STPPOS
255   0017    TIME0:     EQU    M?TIME0
256   0019    TIME1:     EQU    M?TIME1
257   001A    STPSIZ:    EQU    M?STPSIZ
258   001C    VLVPOS:    EQU    M?VLVPOS
259   0000                       CODE
260   0000    M?PRCSET           EQU $
261   007D    RESET:     EQU    M?RESET
262   0108    TIMER0:    EQU    M?TIMER0
263   0123    TIMER1:    EQU    M?TIMER1
264   0134    STIMER:    EQU    M?STIMER
265   0194    TM0ON:     EQU    M?JTM0ON
266   019E    TM0OFF:    EQU    M?JTM0OFF
267   01A9    TM1ON:     EQU    M?JTM1ON
268   01B3    TM1OFF:    EQU    M?JTM1OFF
269   01BA    STMON:     EQU    M?JSTMON
270   01C4    STMOFF:    EQU    M?JSTMOFF
271   00F7    CTCSET:    EQU    M?CTCSET
272   023A    SIOSET:    EQU    M?SIOSET
273   0208    ADCSET:    EQU    M?ADCSET
274   025B    STPSET:    EQU    M?STPSET
275   00F5    INTOFF:    EQU    M?JINTOFF
276   00F3    INTON:     EQU    M?JINTON
277   0292    STPUP:     EQU    M?JSTPUP
```

```
278    02B0                STPDN:    EQU    M?JSTPDN
279    028A                STPOFF:   EQU    M?JSTPOFF
280    0215                LEDOUT:   EQU    M?JLEDOUT
281    0306                VLVSTS:   EQU    M?JVLVSTS
282    0000                          CODE
283    0000                M?LOROM   EQU    $
284                        *NOLIST
286                        *LIST
287    0005 C 0801         VEC0:     DEFW   TIMER0
288    0007 C 2301         VEC1:     DEFW   TIMER1
289    0009 C 3401         VEC2:     DEFW   STIMER
290    000B C 7D00         VEC3:     DEFW   RESET
291                        *NOLIST
295                        *LIST
296    0035 C C37D00       I8080:    JP     RESET
297                        *NOLIST
302                        *LIST
303    0045 C C37D00       NMI:      JP     RESET
304                        *NOLIST
307                        *LIST
308    007D                          CODE
309    007D                M?RESET   EQU    $
310    007D C C3CB00                 JP     M?JRESET
311    ;
312    0080                          CODE
313    0080                M?SETIN   EQU    $
314    0080 C C3CF01                 JP     M?JSETIN
315    0083                          CODE
316    0083                M?ADCIN   EQU    $
317    0083 C C3FD01                 JP     M?JADCIN
318    0086                          CODE
319    0086                M?ADCSTS  EQU    $
320    0086 C C3F401                 JP     M?JADCSTS
321    0089                          CODE
322    0089                M?ADCGO   EQU    $
323    0089 C C31102                 JP     M?JADCGO
324    008C                          CODE
325    008C                M?LEDOUT  EQU    $
326    008C C C31502                 JP     M?JLEDOUT
327    008F                          CODE
328    008F                M?SINSTS  EQU    $
329    008F C C34302                 JP     M?JSINSTS
330    0092                          CODE
331    0092                M?SOUTST  EQU    $
332    0092 C C34C02                 JP     M?JSOUTST
333    0095                          CODE
334    0095                M?SIOIN   EQU    $
335    0095 C C35502                 JP     M?JSIOIN
336    0098                          CODE
337    0098                M?SIOOUT  EQU    $
338    0098 C C35802                 JP     M?JSIOOUT
339    009B                          CODE
340    009B                M?VLVON   EQU    $
341    009B C C35E02                 JP     M?JVLVON
342    009E                          CODE
343    009E                M?VLVOFF  EQU    $
344    009E C C36902                 JP     M?JVLVOFF
345    00A1                          CODE
346    00A1                M?SOLON   EQU    $
347    00A1 C C37F02                 JP     M?JSOLON
348    00A4                          CODE
349    00A4                M?SOLOFF  EQU    $
350    00A4 C C37402                 JP     M?JSOLOFF
351    00A7                          CODE
352    00A7                M?STPOFF  EQU    $
353    00A7 C C38A02                 JP     M?JSTPOFF
354    00AA                          CODE
355    00AA                M?STPUP   EQU    $
356    00AA C C39202                 JP     M?JSTPUP
357    00AD                          CODE
358    00AD                M?STPDN   EQU    $
359    00AD C C3B002                 JP     M?JSTPDN
360    00B0                          CODE
361    00B0                M?IMOON   EQU    $
362    00B0 C C39401                 JP     M?JIMOON
363    00B3                          CODE
```

```
564   0083              M2TM00FF              EQU $
565   0083 C C3B301                  JP       M2JTM1OFF
566   0086                           CODE
567   0086              M2TM1ON               EQU $
568   0086 C C3A901                  JP       M2JTM1ON
569   0089                           CODE
570   0089              M2TM1OFF              EQU $
571   0089 C C3B900                  JP       M2JTM1OFF
572   008C                           CODE
573   008C              M2STMON               EQU $
574   008C C C3BA01                  JP       M2JSTMON
575   008F                           CODE
576   008F              M2STMOFF              EQU $
577   008F C C3C401                  JP       M2JSTMOFF
578   00C2                           CODE
579   00C2              M2INTON               EQU $
580   00C2 C C3F300                  JP       M2JINTON
581   00C5                           CODE
582   00C5              M2INTOFF              EQU $
583   00C5 C C3F500                  JP       M2JINTOFF
584   00C8                           CODE
585   00C8              M2VLVSTS              EQU $
586   00C8 C C30603                  JP       M2JVLVSTS
587   00CB                           CODE
588   00CB              M2JRESET              EQU $
589   00CB F3                        DI
590   00CC 31FFFF                    LD       SP,UTOP
591   00CF C CDF700                  CALL     CTCSET
592   00D2 C CD0802                  CALL     ADCSET
593   00D5 C CD3A02                  CALL     STOSET
594   00D8 3E00                      LD       A,0
595   00DA ED47                      LD       I,A
596   00DC ED5E                      IM       2
597   00DE D 320000                  LD       (B1),A
598   00E1 D 320100                  LD       (B2),A
599   00E4 D 320200                  LD       (B3),A
600   00E7 D 320300                  LD       (B4),A
601   00EA C CD1502                  CALL     LEDOUT
602   00ED C CDE802                  CALL     STPSET
603   00F0 X C30000                  JP       M2M1STRT
604   ;
605   00F3                           CODE
606   00F3              M2JINTON              EQU $
607   00F3 FB                        EI
608   00F4 C9                        RET
609   ;
610   00F5                           CODE
611   00F5              M2JINTOFF             EQU $
612   00F5 F3                        DI
613   00F6 C9                        RET
614   ;
615   00F7                           CODE
616   00F7              M2CTCSET              EQU $
617   00F7 3E09                      LD       A,CTCVEC
618   00F9 D37C                      OUT      (CTC0),A
619   00FB D37C                      OUT      (CTC0),A
620   00FD 3E01                      LD       A,CTCDIS
621   00FF D37C                      OUT      (CTC0),A
622   0101 D37D                      OUT      (CTC1),A
623   0103 D37E                      OUT      (CTC2),A
624   0105 D37F                      OUT      (CTC3),A
625   0107 C9                        RET
626   ;
627   0108                           CODE
628   0108              M2TIMER0              EQU $
629   0108 F3                        DI
630   0109 F5                        PUSH     AF
631   010A D5                        PUSH     DE
632   010B E5                        PUSH     HL
633   010C D 2A1700                  LD       HL,(TIME0)
634   010F E5                        PUSH     HL
635   0110 11FF7F                    LD       DE,7FFFH
636   0113 A7                        AND      A,A
637   0114 ED52                      SBC      HL,DE
638   0116 F1                        POP      HL
639   0117 3004                      JR       NC,TM0RET
```

```
440   0119    23                      INC     HL
441   011A D  221700                  LD      (TIME0),HL
442   011D    FB          THORET: POP     HL
443   011E    D1                      POP     DE
444   011F    F1                      POP     AF
445   0120    FB                      EI
446   0121    ED4D                    RETI
447                           ;
448   0123                            CODE
449   0123                M2TIMER1            EQU $
450   0123    F3                      DI
451   0124    F5                      PUSH    AF
452   0125 D  3A1900                  LD      A,(TIME1)
453   0128    FE7F                    CP      7FH
454   012A    3004                    JR      NC,TM1RET
455   012C    3C                      INC     A
456   012D D  321900                  LD      (TIME1),A
457   0130    F1          TM1RET: POP     AF
458   0131    FB                      EI
459   0132    ED4D                    RETI
460                     ;
461   0134                            CODE
462   0134                M2STIMER            EQU $
463   0134    FB                      EI
464   0135    F5                      PUSH    AF
465   0136    D5                      PUSH    DE
466   0137    E5                      PUSH    HL
467   0138 D  2A1A00                  LD      HL,(STPSIZ)
468   013B    7C                      LD      A,H
469   013C    B5                      OR      L
470   013D    2005                    JR      NZ,STMCMP
471   013F C  CD8A02      STM2:   CALL    M2JSTPOFF
472   0142    1848                    JR      STMRET
473   0144    CB7C        STMCMP: BIT     7,H
474   0146    2024                    JR      NZ,STMDWN
475   0148    2B                      DEC     HL
476   0149 D  221A00                  LD      (STPSIZ),HL
477   014C D  2A1C00                  LD      HL,(VLVPOS)
478   014F    23                      INC     HL
479   0150 D  221C00                  LD      (VLVPOS),HL
480   0153    112003                  LD      DE,VLVMAX
481   0156    A7                      AND     A,A
482   0157    ED52                    SBC     HL,DE
483   0159    380C                    JR      C,STMUP2
484   015B D  ED531C00                LD      (VLVPOS),DE
485   015F    210000                  LD      HL,0
486   0162 D  221A00                  LD      (STPSIZ),HL
487   0165    18D8                    JR      STM2
488   0167 C  CD9202      STMUP2: CALL    M2JSTPUP
489   016A    1823                    JR      STMRET
490   016C    23          STMDWN: INC     HL
491   016D D  221A00                  LD      (STPSIZ),HL
492   0170    DB02                    IN      A,(STATIN)
493   0172    E601                    AND     01H
494   0174    200B                    JR      NZ,STMDN2
495   0176    210000      STMDN1: LD      HL,0
496   0179 D  221A00                  LD      (STPSIZ),HL
497   017C D  221C00                  LD      (VLVPOS),HL
498   017F    18BE                    JR      STM2
499   0181 D  2A1C00      STMDN2: LD      HL,(VLVPOS)
500   0184    7C                      LD      A,H
501   0185    B5                      OR      L
502   0186    28EE                    JR      Z,STMDN1
503   0188    2B                      DEC     HL
504   0189 D  221C00                  LD      (VLVPOS),HL
505   018C C  CD8D02                  CALL    M2JSTPON
506   018F    E1          STMRET: POP     HL
507   0190    D1                      POP     DE
508   0191    F1                      POP     AF
509   0192    ED4D                    RETI
510                     ;
511   0194                            CODE
512   0194                M2JTMOON            EQU $
513   0194    3E85                    LD      A,CTCEN
514   0196    D37C                    OUT     (CTC0),A
```

```
515     019B    3E4C            LD      A,CTCTC
516     019A    D37C            OUT     (CTC0),A
517     019C    FB              EI
518     019D    C9              RET
519     ;
520     019E                            CODE
521     019E            M?JTM0OFF       EQU $
522     019E    F3              DI
523     019F    3E03            LD      A,CTCRES
524     01A1    D37C            OUT     (CTC0),A
525     01A3    3E01            LD      A,CTCDIS
526     01A5    D37C            OUT     (CTC0),A
527     01A7    FB              EI
528     01A8    C9              RET
529     ;
530     01A9                            CODE
531     01A9            M?JTM1ON        EQU $
532     01A9    3E85            LD      A,CTCEN
533     01AB    D37D            OUT     (CTC1),A
534     01AD    3E4C            LD      A,CTCTC
535     01AF    D37D            OUT     (CTC1),A
536     01B1    FB              EI
537     01B2    C9              RET
538     ;
539     01B3                            CODE
540     01B3            M?JTM1OFF       EQU $
541     01B3    F3              DI
542     01B4    3E03            LD      A,CTCRES
543     01B6    D37D            OUT     (CTC1),A
544     01B8    FB              EI
545     01B9    C9              RET
546     ;
547     01BA                            CODE
548     01BA            M?JSTMON        EQU $
549     01BA    3EA5            LD      A,CTCSEN
550     01BC    D37E            OUT     (CTC2),A
551     01BE    3E4B            LD      A,CTCSTC
552     01C0    D37E            OUT     (CTC2),A
553     01C2    FB              EI
554     01C3    C9              RET
555     ;
556     01C4                            CODE
557     01C4            M?JSTMOFF       EQU $
558     01C4    F3              DI
559     01C5    3E03            LD      A,CTCRES
560     01C7    D37E            OUT     (CTC2),A
561     01C9    3E01            LD      A,CTCDIS
562     01CB    D37E            OUT     (CTC2),A
563     01CD    FB              EI
564     01CE    C9              RET
565     ;
566     01CF                            CODE
567     01CF            M?JSETIN        EQU $
568     01CF    DB00            IN      A,(SETLO)
569     01D1    F5              PUSH    AF
570     01D2    E60F            AND     0FH
571     01D4    D 320000        LD      (B1),A
572     01D7    F1              POP     AF
573     01D8    E6F0            AND     0F0H
574     01DA    0F              RRCA
575     01DB    0F              RRCA
576     01DC    0F              RRCA
577     01DD    0F              RRCA
578     01DE    D 320100        LD      (B2),A
579     01E1    DB01            IN      A,(SETHI)
580     01E3    F5              PUSH    AF
581     01E4    E60F            AND     0FH
582     01E6    D 320200        LD      (B3),A
583     01E9    F1              POP     AF
584     01EA    E6F0            AND     0F0H
585     01EC    0F              RRCA
586     01ED    0F              RRCA
587     01EE    0F              RRCA
588     01EF    0F              RRCA
589     01F0    D 320300        LD      (B4),A
```

```
590   01F3   C9                        RET
591   ;
592   01F4                             CODE
593   01F4          M2JADCSTS          EQU $
594   01F4   3AFBF0                LD  A,(ADCEOC)
595   01F7   2F                    CPL
596   01F8   A7                    AND A,A
597   01F9   C8                    RET Z
598   01FA   3E01                  LD  A,1
599   01FC   C9                    RET
600   01FD                             CODE
601   01FD          M2JADCIN           EQU $
602   01FD   3AFCF0                LD  A,(ADCLO)
603   0200   2F                    CPL
604   0201   6F                    LD  L,A
605   0202   3AFDF0                LD  A,(ADCHI)
606   0205   2F                    CPL
607   0206   67                    LD  H,A
608   0207   C9                    RET
609   ;
610   ;
611   0208                             CODE
612   0208          M2ADCSET           EQU $
613   0208   AF                    XOR A
614   0209   2F                    CPL
615   020A   32FFF0                LD  (ADCSEL),A
616   020D   32F9F0                LD  (ADCMUX),A
617   0210   C9                    RET
618   ;
619   0211                             CODE
620   0211          M2JADCGO           EQU $
621   0211   32FAF0                LD  (ADCCON),A
622   0214   C9                    RET
623   0215                             CODE
624   0215          M2JLEDOUT          EQU $
625   0215 D 3A0100               LD   A,(B2)
626   0218   E60F                 AND  0FH
627   021A   07                   RLCA
628   021B   07                   RLCA
629   021C   07                   RLCA
630   021D   07                   RLCA
631   021E   47                   LD   B,A
632   021F D 3A0000               LD   A,(B1)
633   0222   E60F                 AND  0FH
634   0224   B0                   OR   B
635   0225   D300                 OUT  (LEDLO),A
636   0227 D 3A0300               LD   A,(B4)
637   022A   E60F                 AND  0FH
638   022C   07                   RLCA
639   022D   07                   RLCA
640   022E   07                   RLCA
641   022F   07                   RLCA
642   0230   47                   LD   B,A
643   0231 D 3A0200               LD   A,(B3)
644   0234   E60F                 AND  0FH
645   0236   B0                   OR   B
646   0237   D301                 OUT  (LEDHI),A
647   0239   C9                   RET
648   ;
649   023A                             CODE
650   023A          M2SIOSET           EQU $
651   023A   3E02                 LD   A,2
652   023C   D30D                 OUT  (SIOCON),A
653   023E   3E00                 LD   A,0
654   0240   D30E                 OUT  (SIOSC),A
655   0242   C9                   RET
656   ;
657   0243                             CODE
658   0243          M2JSINSTS          EQU $
659   0243   3A0900               LD   A,(SIOSTS)
660   0246   E640                 AND  DAVMSK
661   0248   C8                   RET  Z
662   0249   3E01                 LD   A,1
663   024B   C9                   RET
664   ;
```

```
665    024C                              CODE
666    024C           M?JSOUTST          EQU $
667    024C   3AD900              LD     A,(SIOSTS)
668    024F   E680                AND    RDYMSK
669    0251   C8                  RET    Z
670    0252   3E01                LD     A,1
671    0254   C9                  RET
672           ;
673    0255                              CODE
674    0255           M?JSIOIN           EQU $
675    0255   DBDC                IN     A,(SIODAT)
676    0257   C9                  RET
677           ;
678    0258                              CODE
679    0258           M?JSIOOUT          EQU $
680    0258 D 3A1400              LD     A,(OI)
681    025B   D3DC                OUT    (SIODAT),A
682    025D   C9                  RET
683           ;
684    025E                              CODE
685    025E           M?JVLVON           EQU $
686    025E D 3A1600              LD     A,(STPPOS)
687    0261   F640                OR     40H
688    0263   D302                OUT    (STPOUT),A
689    0265 D 321600              LD     (STPPOS),A
690    0268   C9                  RET
691           ;
692    0269                              CODE
693    0269           M?JVLVOFF          EQU $
694    0269 D 3A1600              LD     A,(STPPOS)
695    026C   E63F                AND    3FH
696    026E D 321600              LD     (STPPOS),A
697    0271   D302                OUT    (STPOUT),A
698    0273   C9                  RET
699           ;
700    0274                              CODE
701    0274           M?JSCLOFF          EQU $
702    0274 D 3A1600              LD     A,(STPPOS)
703    0277   E64F                AND    4FH
704    0279 D 321600              LD     (STPPOS),A
705    027C   D302                OUT    (STPOUT),A
706    027E   C9                  RET
707           ;
708    027F                              CODE
709    027F           M?JSOLON           EQU $
710    027F D 3A1600              LD     A,(STPPOS)
711    0282   F630                OR     30H
712    0284   D302                OUT    (STPOUT),A
713    0286 D 321600              LD     (STPPOS),A
714    0289   C9                  RET
715           ;
716    028A                              CODE
717    028A           M?JSTPOFF          EQU $
718    028A D 3A1600              LD     A,(STPPOS)
719    028D   E670                AND    70H
720    028F   D302                OUT    (STPOUT),A
721    0291   C9                  RET
722           ;
723    0292                              CODE
724    0292           M?JSTPUP           EQU $
725    0292 D 3A1600              LD     A,(STPPOS)
726    0295   F5                  PUSH   AF
727    0296   E60F                AND    0FH
728    0298   FE06                CP     6
729    029A   2004                JR     NZ,SU5
730    029C   3E05                LD     A,5
731    029E   1812                JR     SJEND
732    02A0   FE05   SU5:         CP     5
733    02A2   2004                JR     NZ,SU9
734    02A4   3E09                LD     A,9
735    02A6   180A                JR     SJEND
736    02A8   FE09   SU9:         CP     9
737    02AA   2004                JR     NZ,SUA
738    02AC   3E0A                LD     A,0AH
739    02AE   1802                JR     SJEND
740    02B0   3E06   SUA:         LD     A,6
741    02B2   47     SJEND:       LD     B,A
```

```
742      0283      F1                          POP      AF
743      0284      E6F0                        AND      0F0H
744      0286      B0                          OR       B
745      0287      D302                        OUT      (STPOUT),A
746      0289 D    321600                      LD       (STPPOS),A
747      028C      C9                          RET
748      ;
749      028D                                           CODE
750      028D                  M2JSTPDN                 EQU $
751      028D D    3A1600      SD2:       LD   A,(STPPOS)
752      02C0      F5                          PUSH     AF
753      02C1      E60F                        AND      0FH
754      02C3      FE0A                        CP       0AH
755      02C5      2004                        JR       NZ,STEP9
756      02C7      3E09                        LD       A,9
757      02C9      1812                        JR       STPEND
758      02CB      FE09        STEP9:     CP   9
759      02CD      2004                        JR       NZ,STEP5
760      02CF      3E05                        LD       A,5
761      02D1      180A                        JR       STPEND
762      02D3      FE05        STEP5:     CP   5
763      02D5      2004                        JR       NZ,STEP6
764      02D7      3E06                        LD       A,6
765      02D9      1802                        JR       STPEND
766      02DB      3E0A        STEP6:     LD   A,0AH
767      02DD      47          STPEND:    LD   B,A
768      02DE      F1                          POP      AF
769      02DF      E6F0                        AND      0F0H
770      02E1      B0                          OR       B
771      02E2      D302                        OUT      (STPOUT),A
772      02E4 D    321600                      LD       (STPPOS),A
773      02E7      C9                          RET
774      ;
775      02E8                                           CODE
776      02E8                  M2STPSET                 EQU $
777      02E8      3E00                        LD       A,0
778      02EA      D302                        OUT      (STPOUT),A
779      02EC D    321600                      LD       (STPPOS),A
780      02EF      2188FA                      LD       HL,-1400
781      02F2 D    221A00                      LD       (STPSIZ),HL
782      02F5      21DC05                      LD       HL,1500
783      02F8 D    221C00                      LD       (VLVPOS),HL
784      02FB C    CD3A01                      CALL     STMON
785      02FE D    2A1C00      STPST2:    LD   HL,(VLVPOS)
786      0301      7C                          LD       A,H
787      0302      B5                          OR       L
788      0303      20F9                        JR       NZ,STPST2
789      0305      C9                          RET
790
791      0306                                           CODE
792      0306                  M2JVLVSTS                EQU $
793      0306      DB02                        IN       A,(STATIN)
794      0308      E601                        AND      01
795      030A      C9                          RET
804                                                     END
```

RROR COUNT 0

PU (SEC)=58

```
 1                        (*$A+,M-,C+$*)
 2                            MODULE TJBTL ;
 3                        (* Edit # : 4
 4                         *
 5                         *
 6                         *
 7                         * Created By: TIM
 8                         * Date Last Edited: THU, FEB  7, 1980,  5:44 PM
 9                         * Last Edited By: TIM
10                         * Date Last Compiled/Assembled: THU, FEB  7, 1980,  5:47
11                         * Last Compiled/Assembled By: TIM
12                         *
13                        *LIST
```

```
 14      ;(*$A+,M-,C+$*)
 15      0000                  M2TJBT1              EQU    $
 16      ;    MODULE TJBT1 ;
 17      ;(* Edit # : 4                                                    *
 18      ; *                                                               *
 19      ; *                                                               *
 20      ; *                                                               *
 21      ; * Created By: TIM                                               *
 22      ; * Date Last Edited: THU, FEB  7, 1980,  5:44 PM                 *
 23      ; * Last Edited By: TIM                                           *
 24      ; * Date Last Compiled/Assembled: THU, FEB  7, 1980,  5:47 PM     *
 25      ; * Last Compiled/Assembled By: TIM                               *
 26      ; *                                                              *)
 27      0000                                       CODE
 28      ;CONSTANT
 29      0029                  M2MAXTAB             EQU         41
 30      ;    MAXTAB=41;
 31      ;
 32      ;
 33      0000                                       DATA
 34      ;GLOBAL
 35                            M2IDCAL              GBL BINT
 36      0000                  M2IDCAL              DEFS    1
 37
 38                            M2DCAL               GBL L2DCAL
 39      ;    DCAL:ASSEMBLY PROCEDURE(INDEX:BINT):INTEGER;
 40      ;
 41      ;
 42      ;
 43      ;(***************************)
 44      ;
 45                            *NOLIST
 46                            *LIST
 47      0000                  DINDEX:    EQU    M2IDCAL
 48      0029                  MAXTAB:    EQU    M2MAXTAB
 49      0000  D 3A0000                   LD     A,(DINDEX)
 50      0003    FE2A                     CP     MAXTAB+1
 51      0005    3802                     JR     C,DSLT2
 52      0007    3E29                     LD     A,MAXTAB
 53      0009    87        DSLT2:         ADD    A,A
 54      000A    5F                       LD     E,A
 55      000B    1600                     LD     D,0
 56      000D  C 211600                   LD     HL,DTABLE
 57      0010    19                       ADD    HL,DE
 58      0011    7E                       LD     A,(HL)
 59      0012    23                       INC    HL
 60      0013    66                       LD     H,(HL)
 61      0014    6F                       LD     L,A
 62      0015    C9                       RET
 63      ;
 64      0016                  DTABLE     EQU    $
 65      0016    0000         D0:         DEFW   0000
 66      0018    0000         D1:         DEFW   0000
 67      001A    43FD         D2:         DEFW   -701
 68      001C    8303         D3:         DEFW   0897
 69      001E    9406         D4:         DEFW   1620
 70      0020    E907         D5:         DEFW   2025
 71      0022    250A         D6:         DEFW   2597
 72      0024    590C         D7:         DEFW   3161
 73      0026    4A0E         D8:         DEFW   3658
 74      0028    1110         D9:         DEFW   4113
 75      002A    B011         D10:        DEFW   4528
 76      002C    EA12         D11:        DEFW   4842
 77      002E    6014         D12:        DEFW   5216
 78      0030    C015         D13:        DEFW   5568
 79      0032    0117         D14:        DEFW   5889
 80      0034    2F18         D15:        DEFW   6191
 81      0036    4319         D16:        DEFW   6467
 82      0038    531A         D17:        DEFW   6739
 83      003A    581B         D18:        DEFW   7000
 84      003C    541C         D19:        DEFW   7252
 85      003E    5C1D         D20:        DEFW   7516
 86      0040    761E         D21:        DEFW   7798
 87      0042    881F         D22:        DEFW   8075
 88      0044    8020         D23:        DEFW   8335
 89      0046    9721         D24:        DEFW   8599
```

| | | | | | |
|---|---|---|---|---|---|
| 92 | 0048 | BD22 | D25: | DEFW | 8845 |
| 93 | 004A | A123 | D26: | DEFW | 9121 |
| 94 | 004C | 9824 | D27: | DEFW | 9371 |
| 95 | 004E | B525 | D28: | DEFW | 9655 |
| 96 | 0050 | E226 | D29: | DEFW | 9954 |
| 97 | 0052 | FF27 | D30: | DEFW | 10239 |
| 98 | 0054 | 4929 | D31: | DEFW | 10569 |
| 99 | 0056 | 8B2A | D32: | DEFW | 10888 |
| 100 | 0058 | BF2B | D33: | DEFW | 11199 |
| 101 | 005A | 3C2D | D34: | DEFW | 11580 |
| 102 | 005C | F12D | D35: | DEFW | 11761 |
| 103 | 005E | 242F | D36: | DEFW | 12068 |
| 104 | 0060 | 7030 | D37: | DEFW | 12400 |
| 105 | 0062 | 9D31 | D38: | DEFW | 12701 |
| 106 | 0064 | 1232 | D39: | DEFW | 12818 |
| 107 | 0066 | CF32 | D40: | DEFW | 13005 |
| 108 | 0068 | F333 | D41: | DEFW | 15297 |
| 109 | ; | | | | |
| 118 | | | | END | |

```
(*$R-,S-,P-*)
   LOAD MODULE TJHMOD
(* Edit # : 41.
 *
 *
 * Date Created: THU, FEB  7, 1980,  5:52 PM                          *
 * Created By: TIM                                                    *
 * Associated Loadlist: TJBL1                                         *
 * Loadlist Edit # : 7                                                *
 *                                                                    *)
/0003210633343536370801260137018900313132333435363738394142434445463231323300
/002421093435363738394142434445463331323334353637C38000424344454634313233344F9
/0043210C353637383941424344454635313233343536373839414243444546363132333435D3
/0066210FC380003041424344454635313233343536373839414243444546C3CE00C3D201C326
/008721120002C3F701C31402C31B02C31602C34F02C35802C35B02C36102C35C02C3A202C33B
/00A9211577020C3B002C39502C3C002C39701C3B601C3AC01C3BC00C3BD01C3C701C3F600C370
/00C9211BF80CC30903F331FFFFCDFA00CDB02CD5D023E00ED47CD5L3200FF3201FF3202FF0B
/00EA2119320 3FFCD1B02CDEB02C30010FBC9F3C93EBBD37CD37C3E01D37CD57DD37ED37FC9FC
/0108210FF3F505F52A17FFED511FF7FA7ED52E13094232217FFF1D1F1FBED4DF3F53A19FFFE29
/012C21127F30043C3219FFF1FBCD4DFBF5D5E52A1AFF7CB52005CD8D02184BCD7C20242822CC
/014D21151AFFE2A1CFF23221CFF112003A7ED5238DCEDJ31CFF210000221AFF18D8CD95021B3
/016E21182323221AFFDB02E6012D082100002221AFF221CFF18BE2A1CFF7CB528EE2B221CFFB0
/018F211BCDCD02E1D1F1ED4D3E85D37C3E4CD37CFBC9F33E03D37C3E01D37CFBC93E85D37D23
/01B0210F3E4CD37DFBC9F33E03D37DFBC93EA5D37E3E4BD37EFBC9F33E03D37E3E01D37EFB42
/01D12112C9D800F5E68F3200FFFIE6F00F0F0F0F3201FFDB01F5F60F3202FFF1E6F00F0F0FEF
/01F221150F3203FFC93AFBF02FA7CB3F01C93AFCF02F6F3AFDF02F67C9AF2F32FFF032F9F02D
/0213210C932FAF0C93A01FFE60F0707070747A00FFE60FB0D3003A03FFE60F070707070747AE
/023421000 3A02FFE60FB0D3010F93E02D3D03E00D3D02C93AD0D06540C83E01C93ADD00E680CBED
/025521003E01C90D0CC93A14FFD3DCC33A15FFF5A0D3023216FFC93A16FFE63F3216FFD3020B
/0276201 1C93A16FFE64F3216FFD302CV3A16FFE53D03023216FFC93A16FFE670D302C93ADB
/029621141 6F5F5E69FF0520043E051812F6052001 3E021B0AF6F0920043E0A18023E0647F180
/02B8721 17E6F0B0D3023216FFC93A16FFE5E60FFE0A20043E091812FF0920043E05180AFED5B2
/02D8211A20043E051B023F0A47F1E6F0B0D3023216FFC93E0003023216FF2198FA221AFF2185
/02F91520VC05221CFFCD8D012A1CFF7CB520F9C8DB02E601C94C
/340021073A1FFFFE2A38023E29875F1600211504197E23665FC90000000043FD83035406F975
/0421210A07250A590C4A0E1110B011EA126014C01501172F184319531A5B18541C5C1D761E47
/044221000881F8D2007218D22A1223B248525E226FF274929882ABF283C20F120242F70309D85
/0463071143112320F32F33343
/0800210BA7ED5203C01B1CCB01DFD5AC9A7ED52180119F51FAAC3CB95FA1B08CB9D5E3F1C9D5EBCD41
/09021210EDFD80D1C9DE0057CDD6089781730037C92577AA7FA389941ED42C97A0FBA2B0FEB7AD1
/084221110FBA280947A2FABC30D0A575F177B4A4DCD060B30033FED42406F78177C613001BA
/086321149 3CB11CE002D00474FA7ED4AC97BACF57C07BD200B0C2008C54248FDED01180C78E8
/0984211 707B92046B82043FDF5C1F51F3001D57BCDD6085F7ACDD9085F70D5FE1D30073FEDE8
/08A5211A52D1D5F5377BCDD908A5F7ACDD9080CB12D0035FED42CB1A573005F1C1ED427A0701CA
/08C6211D0000DE04AFDC5E1EBC1C8782F47C3F50A2100001FCDDD083001DCB1CC81D1F30018H2
/08E7212009CB1CCB1D1F3001D03CB1CCB1D1F3001D09CB1CCB1D1FC98720022AFC95FA817781FD4
/09082114577B07FA1009DD445F7887F21809DE445FDE07AFCB15178D3A2409930DF21C09CBE1
/0929211715C8722802FD4477DFF902308BC87A2402ED40BFC9CB7A20FAAF7DC9B72004AF67F4
/094A211AGFC947AC177C1E577BA7FA5709ED4447CB7C2806AF956F9F9467AF0E0FED6A17801A
/0958211DDASF09900DF2670FED6AC8722802ED4477DB720058UFEB0280CCB7A2806AF956FE2
/098C21200 F9467BFCBCB7A20FAAFC9EBAF958DB42002AFC90600AA17CB107A17CB10CB7C20FF
/09AD2020BGAF956F9F9467C37A2806AF935F9F925778A44D2600DGCB7CB13CB12ED6A09DAE8
/09CD2125D10FD42CB13CB12F6AC610D2CB09B7CB1D471F300FAF956F9F94677BB720F6
/09EE212805H2FEB0280DCB4028D6AF935F9F925F8BFC9C848A20F9EBAFC9FD19ED4AFDE50141
/0A0F2110 0C3F30AAFFDF5E3CD5E0B2001300605F1E042CA13BAC03CC9AF47935F789A577806
```

```
/0A30211CCD6F789C67E0C3E30A7C45BC24AE01FB5C9972A3E3E002A573E009D6FF0E25B0A2EF7
/0A51201235241AECDA2CC987EA610A25CFEAFCDAFFC9FDF30C9D28632C2D285F788437E2FD
/0A712115740A3F4CC1E9E5C53C81F504C54CC54FC521000DFCB19300219881FCB1CCB1DCBAB
/0A922118390C288DAC110FDC10C00F2A3CAA7ED52CBD10405F24D0AA7FD5299160215298FE2BE
/0AB5211BAF0A1FCB1CCB1DFBCFE7CC1B0576C4D40CCCB19500TAFB5FDE9C1AF67CDECDAFDC93C
/0AD421110C425F2DF0A21FF802502D21007F24C91915CD60AF863BC92425F2FE0A7D2F3C3DCE
/0AF521210DD50A55506C267FC92100D0552D2C20C21F8FC9F2100B3E8D3DC93E7F3C097A93F1
/0B215211157ACAFE0AB10010010CB028FE2100C1FCB135C36F5960C0FB7AB3B4B5CAFE0A06207A07
/0B3721190529CB13BFE2370B1FCB1BCH1C6F5C5C10C9242SF2A55DB3E0F94F2590BC997575FDE
/0B95B201AC9470748B8280130C4052B07CB29CB1A89108F9556A23047C17FD4AFBC92425FACD
/0B7B211C0D40A33E1F94E28A0BADC3F5DA276FD675FC57C947635A953E004FBFC9CB2ACB1BCB1C01
/0B9940F2CCB1D8910F528047A1FED4ACBED4AC9FA
/0BAB8212CCDD5OBF1C1C1R7FC5FOC3FC9CD50BF1D1E1477DB2B5200CB4FF8020D7CB40200AED
/0BC72212SAF1B09C0402B03CD5F0CHFC97B6285F2DC031FF42004AFFDE1C9FAECDBCD5F0CAF2C
/0BEA2126180?3EG1E5E5D5600FC9FDF5D1C1FDE17B32B5CB8FB4F20A0CCD5FDCF13CCBFFF5F127
/0C092114A0305F5E5FDE5FD210900FD3D210001110D003E0487F0CB0016CB15CB14CB13CB129D
/0C2C211D09ESEBFD3AFBE3DA3E0CFD42E3EBED52FBE3FDCB0016FD6ACB13CB12C620D22C0C29
/0C402129B7CB1ACB1BCB1CCB1DFD2B30C2200CE8C1C9AF735F3E000A573E009D6F3E009C670B
/0C6FD121C915
/0C6F2124AFBD20B2AFC9B92CD55F5F6F5DCC97D6CCS047E5FDE5F1A9FE5F5FD210500FD397D6C03
/0C8D211B614A57CB7C281CAFD2573E009D6F3E009C67E2830CFD3400E2810CF1F1F1C3EC0AD9
/0CB121192640FD2BFD2BFD28CB7B200BAF935F3C00993F3E0098477A1601CD310CD310CDD0C
/0CD2211F31008JBD4ADF0CCB11E1D10S00CB7B28D04CB4528020E01CB3BCB1CCB1D7D816FAE
/0CF321213EC09C573E009B5FCB7B2B03CB3B0478C1B00600F29B0D0491F2100D4CB1B300A7B
/0D142119B7F2FFD0A3EFFAACSECDACB7A5723DBAFJ56F3E09CA73E009B5FBFEHC983ED4ADA44
/0D3518213AD093CB12390617FD6AC3310DFD7200DFD28160CB27ED6AC97B
/0D50211SC1E17DA7F25FDDED44C5D10DC1E17DD1F1C5477C1BCB38300729CB138FEACA0DCB10
/0D712118J8300E29CB13BFEACA002CB138FEACA0DCB38301C29CB138FEACA0D29CB138FEA0B
/0D92211BCAD629CB138FEACA0D2CB133FEACA0DCB3930DCB0CB9CE00201C7B5C652E00E8
/0DB3211FCB38201330DCB0488200CC3DCBR20D50SBC957EB80C9EBC3E30AC1E17DD1E1C5BA
/0DD421214E4E02066CB0AC3DC9FAF781F300AC3CCH1DCB1ACB1BCB181F3012CB2CCB1DCBF6
/0DF52171ACB1BCB1DCB1ACB1B181F3022CB2CCB1DCB1ACB1BCB2CCB1DCB1ACB1BCB29
/0E16211B2CCB1DCB1ACB1BCB2CCB1DCB1ACB181F30D5435A555C611F300444EB6169CBD0
/0E370E26100D7CA5A2A33CCB210000545CC926
/0E45OF258467EDC3ECCAED448467E0C3FEDADA
/0E55211BCD410A7894281BFAB10FE2ADDEFEE9FAB70ECDA70EFD44604778CB2DCB1A1F10F911
/0E74211C5FFD1970B9FDE5B10600LA9J0EGFD2B3FAFE0A70EB042?BFE2890EEB1FCB1ACH1B2F
/0E95201E0S6F7C9D67EAECDAAF85C9FE1BF2B40E18C3D5FDE35050944DE1EBC9F2870ECD1B
/0EB50523A70FAF85C95A
/0EBA0326AFB5C93
/10002104110000FD531EFF114001FD5321FF2127FFCB86110000ED5325FF2128FF3600FD5B96
/1021210710FEFD532DFFCDBFD03215FFC9B5003215FF2127FFCB462851CD5111A71640DEDB
/1042210A52FA551028D0A7EBFD5B2FFFED52F25510181A721204FFD5B2FFFED52F264101BD8
/1053210D0021BD4CD9C112231FFCEDAA12221AFFCD9D133215FFCDBFCD03215FFCD38143215FFD9
/1084200F2127FFCB85185CC9C2135215FFFED5B1AFFF7AB320S0C0BC2003215FFF111400ED5385
/10A4201184FFCDF7143215FFCDBB142204FF110000ED5317FFCDBB142206FF2A04FFED5BD3
/10C4211406FF193E02CD45002237FFEBED5323FFCD3712FD5329FF222BFFCDAA003215FF21F1
/10E5211727FFCBC6C3331DC9CD83003215FF3A02FF5F179F572164000CD3B082225FF3A01FFC6
/1106210B5F179F57210A0DCD3B08ED5B25FF192225FF3A00FF5F179F57192225FFA711000080
/1127210EFD52FA3A11A72A25FF11FB03ED52F23A11181222100FF360F2101FF360ECD8F003298
/11482111156F18A12A25FFC9C9C8142224FF105B17FFED5325FFCDB8142206FF2A04FFED52F
/11692013SB06FF193E02CD45092237FFA7ED5B23FFED522208FFA71100O0ED52F297113ABB
/11B3211S08FE2FSF3A02FF2FS71S0ED530BFF2A03FFC9C9CD3712FD5333FF2235FF444DD5FD23
/11A220196 12DFB2DFFA2BFFCD530EFD5310FF2212FFCDBADEF2D311EDS5B10FF2A12FFCD1F
/11CA211B410AFD5310FF2212FFFED5B2FFFA7AB32007110100FD532FFFED5B10FF2A12FFFD21E3
/11EB211C6S6C017B07CD639AF5D5FD5B2FFCD1A0BFDC1C1CD6F0CEDS30CFF220EFFCD490B26
/12002112FDS331FFA7CB110000FD52F21E12EDS531FFA7210F271CD5431FFED52F23212110FC0
/1220211527EDS531FFC9C9C9FFCC9C92A37FF3E64C5507703200FF3C3201FF3A00FF321EFFCD00
/124721180004220BFF3A01FF3215FFCDD004A7FDC3B08FFED522204FF2A37FF116400CD9709C5
/126F2118CD140B4440D5FOF1110000215407CD6FJCED530CFF220FFFED5B04FFCD140BE5DSEB
/1290200FFD5B04FFCD140BFD2A0CFFED4B0FFFFC530AFDE1C1CD960EC9C9A7210000ED5B1D
/12B8211120FFED52F21C13A7210000FD5R31FFE9F2F21C13CD140BE5D5FDS2D0FFCD140BFD01
/12D121145E1E1CD6F0CCD531FFF2221FFD3210000 14002 D530FF2FB12110000ED531FFFF11A1
/12F22117400ZED5321FFED5B1FFFA21FFCD521D660185FDCD530FFA1C13280E116666ED530E
/1312210B1FFF115SFDCD5321FFFC7D10A7ED5B31FFED52200217FFEBCD140BED530CFF220FF3B
/13342104440D5FDE1FD5B1FF2A21FFCD530AC0190BED5306FFA7EB113AFFED52F25813ED34
/1355201053D6FFA721CB00FD5B06FFD3225F2C3C1311CB00FD5306FF2A2DFFED5B06FF12220F
/137521132DFFA71100009ED52F28413EDS320FA7212B093ED5B29FFED52F298131120D3ED5B86
/13962015D2DFF2A0FFC9C9A7210000ED5B1AFFED52F2B0133A28FFA72000DCB1170019122C4
/13B521181AFF2128FF3601A72AFFF110000FD52F21133A28FFE012011A72A1AFF11170093
/13D72O1AFD5221AFFE212BFF3600C9C0C80D3215FFCD8814L5C7D814D1193F02CD450922BD
/13F72201C0AFFCDC5D03215FF115B02ED5304FFA721ACD0E D5B0AFFED52F21914CDA4032C9
/1417211D15FFCDF7143215FF72A0AFF11F401FD52F25114C0A7D03215FFCDF7143215FFC9DD
/1438213-2100FF36BC2101FF360C2102FF360EEDS31FFFED5304FFA7EB1100000ED52FAB114B5
/14592115A72A04FF111027ED52F2B1142A04FF110A00CD9709783200FF2A04FF3E0ACD4S09A4
```

/147A20182204FF110A00CD97097832011F2A04FF3E0ACJ45092204FF110A00CD97097B3289
/149A211B02FF2A04FF3E0ACD45092204FF110A00CD97097B3203FFCD8F003215FFC92100FFBF
/14BB211E360411000OED930AFFCD8C003215FFCD39D0C8472B0218021AF5CD8600ED580AFFAA
/140C202019220AFF2100FF3520021802180A2A04FF3E04CD45092204AFFC9C9110000E0537D
/14FC142517FFA72A04FFE05B17FFED52F20D151B0218EFC942
/30000303C3809017
/30000009

We claim:

1. Structure comprising:
   a chamber containing a first and a second opening through which fluid can pass;
   a flexible diaphragm located in said chamber so as to divide said chamber into two portions, a first chamber accessed through said first opening and a second portion being accessed through said second opening;
   a magnet attached to said flexible diaphragm;
   means for directing fluid whose flow is being measured through said first opening into said first chamber while withdrawing the fluid whose flow is being measured through said second opening from said second chamber and, into response to a control signal, reversing the chambers in which the fluid is inserted and from which the fluid is withdrawn, the movement of fluid into one chamber and out of the other chamber causing said flexible diaphragm to move into the chamber from which the fluid is being withdrawn;
   means for continuously producing an output signal representative of the position of said magnet;
   means for converting said output signal to a sequence of digital signals;
   means for processing said sequence of digital signals to produce a second signal representative of the flow rate of said fluid into and out of said chamber;
   means for comparing said flow rate to a reference flow rate to produce a control signal representative of the difference between said measured flow rate and said reference flow rate; and
   means, responsive to said control signal, for changing the flow rate of said fluid.

2. Structure comprising:
   a chamber containing a first and a second opening through which fluid can pass;
   a flexible diaphragm located in said chamber so as to divide said chamber into two subchambers, a first subchamber which is accessed through said first opening and a second subchamber which is accessed through said second opening;
   a magnet attached to said flexible diaphragm, said magnet being formed as an integral part of, and being completely enclosed by, the material of said flexible diaphragm;
   means for directing fluid whose flow is being measured through said first opening into said first subchamber while withdrawing the fluid whose flow is being measured through said second opening from said second subchamber and, in response to a control signal, reversing the subchambers into which the fluid is inserted and from which the fluid is withdrawn, the movement of fluid into one subchamber and out of the other subchamber causing said flexible diaphragm to move into the subchamber from which the fluid is being withdrawn;
   means for producing an output signal representative of the position of said magnet;
   means for converting said output signal to a sequence of digital signals;
   means for processing said sequence of digital signals to produce a second signal representative of the flow rate of said fluid into and out of said chamber;
   means for comparing said flow rate to a reference flow rate to produce a control signal representative of the difference between said measured flow rate and said reference flow rate; and
   means, responsive to said control signal, for changing the flow rate of said fluid.

3. Structure as in claim 2 including:
   means for sensing the approach of said magnet to one or the other ends of said chamber and for switching the flow of fluid into said chamber from said first subchamber to said second subchamber and for switching the flow of fluid from said chamber from said second subchamber to said first portion.

4. Structure as in claim 3 including reference means representing the relationship between the position of said magnet and the volumetric displacement of said diaphragm, thereby to enable the determination of the volumetric displacement of said diaphragm from the output signal from said means for producing.

5. Structure as in claim 4 including:
   means for varying the position at which the motion of said flexible diaphragm is reversed by determining the flow rate of said fluid and selecting a reversal point to maximize the sensitivity of the output signal from said means for producing as a function of the displacement of said flexible diaphragm.

6. Structure as in claim 4 including:
   means for reversing the direction of motion of said flexible diaphragm in response to the expiration of a predetermined time.

7. Structure as in claim 2 wherein said chamber is cylindrical.

8. Structure which comprises
   a chamber containing two openings therein;
   a flexible diaphragm containing as a part thereof a magnet, said diaphragm separating said chamber into a first and a second portion and sealing said first portion from said second portion so as to prevent leakage of fluid from said first portion to said second portion or vice versa;
   means for continuously producing an output signal representative of the position of said diaphragm;
   means for selectively controlling the flow into said first portion and out of said second portion and for reversing the flow as desired so that the fluid flows into the second portion and from the first portion;
   means for processing the output signal from said means for producing including
   switching path means for selectively accessing the output signal from said means for producing
   conversion means for converting said output signal from said means for producing to a first digital signal;
   buffer means for storing said first digital signal from said conversion means;
   means for inputting to said system a second digital signal representing a desired fluid flow rate;
   means for storing said second digital signal representing said desired fluid flow rate;

processing means for operating on said first and second digital signals to produce an estimate of the flow rate of fluid into and out of said chamber;

means for storing a signal representative of the flow rate calculated by said processing means; and driver circuit means periodically actuated by said output signal from said processing means to move a control valve either open or closed in response to the output signal stored in said means for storing.

9. Structure as in claim 8 including means for storing the output signal from said processing means representing the calculated flow rate; and means for displaying the calculated fluid flow rate.

10. The method of measuring a fluid flow rate using a chamber containing a first opening and a second opening through which fluid can pass with a flexible diaphragm located in said chamber so as to divide said chamber into two subchambers, a first subchamber which is accessed through said first opening and a second subchamber which is accessed through said second opening, and a magnet attached to said flexible diaphragm, comprising:

directing the fluid whose flow is being measured through said first opening into said first subchamber while withdrawing the fluid whose flow is being measured through said second opening from said second subchamber and, in response to a control signal, reversing the subchambers in which the fluid is inserted and from which the fluid is withdrawn, the movement of fluid into one subchamber and out of the other subchamber causing said flexible diaphragm to move into the subchamber from which the fluid is being withdrawn;

producing a continuous output signal representative of the position of said magnet;

converting said output signal to a sequence of digital signals;

processing said sequence of digital signals to produce a second signal representative of the flow rate of said fluid into and out of said chamber;

comparing said flow rate to a reference flow rate to produce a control signal representative of the difference between said measured flow rate and said reference flow rate; and changing the flow rate of said fluid in response to said control signal.

11. Structure as in claim 2 wherein said means for producing comprises means for continuously producing an output signal representative of the instantaneous position of said magnet, thereby to enable a measure of the instantaneous flow rate of the fluid entering said chamber to be obtained during the trave of said diaphragm from any one position to any other position in said chamber.

* * * * *